United States Patent [19]

Chung et al.

[11] Patent Number: 5,262,075

[45] Date of Patent: * Nov. 16, 1993

[54] MULTIFUNCTIONAL VISCOSITY INDEX IMPROVER EXHIBITNG IMPROVED LOW TEMPERATURE VISCOMETRIC PROPERTIES

[75] Inventors: David Y. Chung, Edison; John E. Johnston, Westfield; Mark J. Struglinski, Bridgewater, all of N.J.

[73] Assignee: Exxon Chemical Patents Inc., Linden, N.J.

[*] Notice: The portion of the term of this patent subsequent to Dec. 1, 2009 has been disclaimed.

[21] Appl. No.: 966,619

[22] Filed: Oct. 26, 1992

Related U.S. Application Data

[63] Continuation of Ser. No. 358,780, May 30, 1989, abandoned.

[51] Int. Cl.$^5$ ................. C10M 149/18; C10M 145/22
[52] U.S. Cl. .................. 252/51.5 A; 252/45; 252/50; 252/22 R; 525/64; 525/66; 525/285; 525/291; 525/298; 525/300; 525/301; 525/303; 525/327.6; 525/327.7; 525/329.5; 525/329.6; 525/329.9; 525/330.1
[58] Field of Search ............ 252/51.5 A, 51.5 R, 252/560 R, 45, 50, 52 R; 525/285, 327.6, 375, 64, 66, 291, 298, 300, 301, 303, 327.7, 329.5, 329.6, 329.9, 330.1

[56] References Cited

U.S. PATENT DOCUMENTS

| | | | |
|---|---|---|---|
| 3,316,177 | 4/1967 | Dorer | 252/51.5 |
| 3,326,804 | 6/1967 | Hu | 252/34 |
| 4,089,794 | 5/1978 | Engel et al. | 252/51.5 A |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/51.5 A |
| 4,160,739 | 7/1979 | Stambaugh et al. | 252/51.5 A |
| 4,169,063 | 9/1979 | Kiovsky | 252/51.5 A |
| 4,171,273 | 10/1979 | Waldbillig et al. | 252/51.5 A |
| 4,219,432 | 8/1980 | Girgenti et al. | 252/51.5 A |
| 4,517,104 | 5/1985 | Bloch et al. | 252/51.5 A |
| 4,540,753 | 9/1985 | Cozewith et al. | 526/88 |
| 4,557,847 | 12/1985 | Gutierrez et al. | 252/56 D |
| 4,632,769 | 12/1986 | Gutierrez et al. | 252/51.5 A |
| 4,803,003 | 2/1989 | Chung | 252/56 D |
| 4,804,794 | 2/1989 | Ver Strate et al. | 585/12 |

FOREIGN PATENT DOCUMENTS

| | | |
|---|---|---|
| 2753569 | 7/1978 | Fed. Rep. of Germany . |
| 2845288 | 4/1979 | Fed. Rep. of Germany . |
| 3025274 | 7/1980 | Fed. Rep. of Germany . |
| 2423530 | 4/1979 | France ............ 252/51.5 A |

*Primary Examiner*—Margaret Medley
*Attorney, Agent, or Firm*—Theodore V. Kowalchyn

[57] ABSTRACT

Multifunctional viscosity index improver additives for oleaginous composition comprising reaction products of (i)(a) ethylene-alpha-olefin copolymers grafted with (i)(b) carboxylic acid material, further reacted with (ii) at least one of polyamine, polyol, about $C_{30}$–$C_{400}$ hydrocarbyl substituted carboxylic acid component together with polyol, or said carboxylic acid component together with polyamine, wherein the copolymer (i)(a) comprises intramolecularly heterogeneous copolymer chains containing at least one crystallizable segment of methylene units and at least one low crystallinity ethylene-alpha-olefin copolymer segment, and wherein said copolymer has a molecular weight distribution characterized by at least one of a ratio of $\overline{M}_w/\overline{M}_n$ of less than 2 and a ratio of $\overline{M}_n/\overline{M}_w$ of less than 1.8.

149 Claims, No Drawings

MULTIFUNCTIONAL VISCOSITY INDEX IMPROVER EXHIBITNG IMPROVED LOW TEMPERATURE VISCOMETRIC PROPERTIES

This application is a 37 C.F.R. 1.62 continuous of U.S. Ser. No. 358,780, now abandoned, which was filed May 30, 1989.

BACKGROUND OF THE INVENTION

The present invention relates to nitrogen or ester containing grafted ethylene copolymers useful as multifunctional viscosity index (V.I.) improver additives, e.g., viscosity index improvers-dispersants, for oleaginous compositions, particularly fuel oils and lubricating oils, methods for preparing said grafted ethylene copolymers, and to oleaginous compositions containing these ester or nitrogen containing grafted copolymers. More specifically the instant invention relates to a copolymer of ethylene with other alpha-olefins as a backbone, said copolymer comprised of segmented copolymer chains with compositions which are intramolecularly heterogeneous and intermolecularly homogeneous, having grafted thereto the residue of ethylenically unsaturated grafting material and reacted with a polyamine containing at least two reactive amino groups or with a polyol. The additives of the instant invention provide oleaginous compositions, particularly lubricating oil compositions, exhibiting improved low temperature viscometric properties compared to conventional nitrogen or ester containing grafted ethylene-alpha-olefin copolymers.

The concept of derivatizing V.I. improving high molecular weight ethylene and alpha-olefin copolymers with acid moieties such as maleic anhydride, followed by reaction with an amine or an amine and a carboxylic acid component to form a V.I.-dispersant oil additive is known and is disclosed, inter alia, in the following patents:

U.S. Pat. No. 3,316,177 teaches ethylene copolymers such as ethylene-propylene, or ethylene-propylenediene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ mono carboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274 5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing, with maleic anhydride and then reacts with primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free-radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 grafts maleic anhydride on an ethylene-propylene copolymer with maleic anhydride at 150° to 210° C. followed by reaction with an amine having one primary or secondary group.

The early patents such as U.S. Pat. Nos. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reaction with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid of U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. Nos. 4,132,661; 4,160,739; 4,171,273; German No. P2753569 9; German No. 2,845,288; and French No. 2,423,530.

U.S. Pat. Nos. 4,516,104 and 4,632,769 represented a further improvement over the art in that they permitted the utilization of the generally less expensive polyamines having two primary amine groups, while achieving good dispersancy levels, inhibiting cross-linking and allowing initiator, e.g., peroxide, grafting in oil.

U.S. Pat. No. 4,517,104 discloses polymeric viscosity index (V.I.) improver-dispersant additives for petroleum oils, particularly lubricating oils, comprising a copolymer of ethylene with one or more $C_3$ to $C_{28}$ alpha-olefins, preferably propylene, which have been grafted with acid moieties, e.g., maleic anhydride, preferably using a free radical initiator in a solvent, preferably lubricating oil, and then reacted with a mixture of a carboxylic acid component, preferably an alkyl succinic anhydride, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769 discloses oil soluble viscosity improving ethylene copolymers such as copolymers of ethylene and propylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking or gelling.

While the additives disclosed in U.S. Pat. Nos. 4,517,104 and 4,632,769 provide quite useful oil compositions there is a need for oil compositions which exhibit better low temperature viscometric properties than those possessed by conventional oil compositions.

The problem of providing V.I. oil additives exhibiting improved low temperature viscometric properties is addressed in U.S. Pat. No. 4,804,794, which is incorporated herein by reference. U.S. Pat. No. 4,804,794 discloses segmented copolymers of ethylene and at least one other alpha-olefin monomer, each copolymer being intramolecularly heterogeneous and intermolecularly homogeneous and at least one segment of the copolymer, constituting at least 10% of the copolymer's chain, being a crystallizable segment. These copolymers are disclosed as exhibiting good mechanical properties such as good shear stability and as being useful V.I. improvers which provide lubricating oils having highly desirable viscosity and pumpability properties at low temperatures. However, these copolymers are disclosed as being V.I. improvers, and there is no disclosure of grafting said copolymers with an ethylenically unsaturated grafting material and thereafter reacting these grafted copolymers with polyamines or polyols to provide multifunctional viscosity index improver additives, e.g., viscosity index improver-dispersant additives, for oleaginous compositions. Indeed, it was heretofore generally believed that these ethylene copolymers could not be grafted with conventional ethylenically unsaturated grafting materials and thereafter reacted with polyamines containing at least two reactive amino groups selected from primary and/or secondary amino groups or with polyols without substantially deleteriously or adversely affecting, i.e., broadening, the narrow molecular weight distribution (MWD). It was believed that this deleterious effect upon the narrow MWD would have a concomitant deleterious effect upon the intermolecular homogeneity and upon the advantageous low temperature viscometric properties. While the nitrogen or ester containing grafted ethylene copolymers, i.e., ethylene copolymers of the instant invention grafted with an ethylenically unsaturated grafting material and reacted with a polyamine containing at least two reactive amino groups or a polyol, do have a broader molecular weight distribution than the ethylene copolymer reactants, it has been surprisingly discovered that oleaginous compositions containing said nitrogen or ester containing grafted ethylene copolymers exhibit better low temperature viscometric properties than those containing conventional nitrogen or ester containing grafted ethylene copolymers. Thus, the multifunctional viscosity index improver additives of the instant invention provide oleaginous compositions, particularly lubricating oil compositions, exhibiting dispersancy and better low temperature viscometric characteristics than conventional multifunctional viscosity index improvers comprised of nitrogen or ester containing grafted conventional ethylene copolymers.

SUMMARY OF THE INVENTION

The present invention is directed to oil soluble nitrogen or ester containing grafted ethylene copolymers useful as multifunctional viscosity index improvers or modifiers, e.g., as V.I. improver-dispersant additives, in oleaginous compositions. The nitrogen or ester containing grafted ethylene copolymers of the instant invention provide oleaginous compositions, in particular lubricating oil compositions, exhibiting improved viscometric properties, particularly highly desirable viscosity properties at low temperatures, and dispersancy characteristics.

The ethylene copolymers of the instant invention are grafted with an ethylenically unsaturated grafting material as described hereinafter and the grafted ethylene copolymers are then reacted with a polyamine containing at least two reactive amino groups selected from primary and secondary amino groups, preferably primary amino groups, or with a polyol.

The copolymers which are grafted and reacted with the polyamine or polyol are disclosed in U.S. Pat. No. 4,804,794, which is incorporated herein by reference.

These copolymers are segmented copolymers of ethylene and at least one other alpha-olefin monomer; each copolymer is intramolecularly heterogeneous and intermolecularly homogeneous and at least one segment of the copolymer, constituting at least 10% of the copolymer's chain, is a crystallizable segment. For the purposes of this application, the term "crystallizable segment" is defined to be each segment of the copolymer chain having a number-average molecular weight of at least 700 wherein the ethylene content is at least 57 wt. %. The remaining segments of the copolymer chain are herein termed the "low crystallinity segments" and are characterized by an average ethylene content of not greater than about 53 wt %. Furthermore, the molecular weight distribution (MWD) of copolymer is very narrow. It is well known that the breadth of the molecular weight distribution can be characterized by the ratios of various molecular weight averages. For example, an indication of a narrow MWD in accordance with the present invention is that the ratio of weight to number-average molecular weight ($\overline{M}_w/\overline{M}_n$) is less than 2. Alternatively, a ratio of the z-average molecular weight to the weight-average molecular weight ($\overline{M}_z/\overline{M}_w$) of less than 1.8 typifies a narrow MWD in accordance with the present invention. It is known that a portion of the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, the copolymer reactants, in accordance with the present invention, are characterized by having at least one of $\overline{M}_w/\overline{M}_n$ less than 2 and $\overline{M}_z/\overline{M}_w$ less than 1.8. The copolymer reactant comprises chains within which the ratio of the monomers varies along the chain length. To obtain the intramolecular compositional heterogeneity and narrow MWD, the ethylene copolymer reactants are preferably made in a tubular reactor.

DETAILED DESCRIPTION OF THE INVENTION

In accordance with the instant invention there are provided ester or nitrogen containing polymeric materials useful as multifunctional viscosity index improvers, particularly viscosity index improver-dispersant additives, for oleaginous materials, particularly lubricating oils, which are comprised of (i) certain specific types of ethylene and alpha-olefin copolymers grafted with (ii) grafting material or compound, preferably ethylenically unsaturated grafting material or compound, and (iii) reacted with (A) a polyamine containing at least two reactive amino groups selected from primary and secondary amino groups, preferably primary amino groups, or (B) polyol.

More particularly, these polymeric materials are comprised of the reaction products of:

(i) backbone copolymer of ethylene and at least one other alpha-olefin monomer, said copolymer comprising intramolecularly heterogeneous and intermolecularly homogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; grafted with (ii) a grafting material or compound, preferably ethylenically unsaturated grafting material or compound; and reacted with (iii) (A) polyamine containing at least two reactive amino groups, or (B) polyol.

When the nitrogen or ester containing grafted ethylene copolymers of the instant invention are incorporated into oleaginous materials such as lubricating oils the resultant oleaginous compositions exhibit better low temperature viscometric properties than oleaginous composition containing conventional ester or nitrogen containing grafted ethylene copolymers. Furthermore, the ester or nitrogen containing grafted ethylene copolymers of this invention function as dispersants in oleaginous compositions, and generally exhibit substantially similar dispersancy efficacy as conventional ester or nitrogen containing grafted ethylene copolymers falling outside the scope of the instant invention.

Ethylene and Alpha-Olefin Copolymer

The ethylene and alpha-olefin copolymers defined as (i) hereinafore are copolymers of ethylene with at least one other alpha-olefin comprised of segmented copolymer chains with compositions which are intramolecularly heterogeneous and intermolecularly homogeneous.

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene, from the average ethylene composition for a given copolymer sample needed to include a given weight percent of the total copolymer sample, which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt. %) ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight-average to number-average molecular weight, $\overline{M}_w/\overline{M}_n$, and z-average to weight-average molecular weight, $\overline{M}_z/\overline{M}_w$, where:

$$M_w = \frac{\Sigma N_i M_i^2}{\Sigma N_i M_i}$$

$$M_n = \frac{\Sigma N_i M_i}{\Sigma N_i}, \text{ and}$$

$$M_z = \frac{\Sigma N_i M_i^3}{\Sigma N_i M_i^2}$$

wherein $N_i$ is the number of molecules of molecular weight $M_i$.

d. Viscosity Index (V.I.) is the ability of a lubricating oil to accommodate increases in temperature with a minimum decrease in viscosity. The greater this ability, the higher the V.I. Viscosity Index is determined according to ASTM D2270.

The instant copolymers are segmented copolymers of ethylene and at least one other alpha-olefin monomer wherein the copolymer's chain contains at least one crystallizable segment of ethylene monomer units, as will be more completely described below, and at least one low crystallinity ethylene-alpha-olefin copolymer segment, where in the low crystallinity copolymer segment is characterized in the unoriented bulk state after at least 24 hours annealing by a degree of crystallinity of less than about 0.2% at 23° C., and wherein the copolymer's chain is intramolecularly heterogeneous and intermolecularly homogeneous, and has an MWD characterized by at least one of $M_w/M_n$ of less than 2 and $\overline{M_z}/\overline{M_w}$ of less than 1.8. The crystallizable segments comprise from about 10 to 90 wt. %, preferably from about 20 to 85 wt. %, of the total copolymer chain, and contain an average ethylene content which is at least about 57 wt. %, preferably at least about 62 wt. %, and more preferably at least about 63 wt. % and which is not greater than 95 wt. %, more preferably <85%, and most preferably <75 wt. % (e.g., from about 58 to 68 wt. %). The low crystallinity copolymer segments comprise from about 90 to 10 wt. %, preferably from about 80 to 15 wt. %, and more preferably from about 65 to 35 wt. %, of the total copolymer chain, and contain an average ethylene content of from about 20 to 53 wt. %, preferably from about 30 to 50 wt. %, and more preferably from about 35 to 50 wt. %. The copolymers comprise intramolecularly heterogeneous chain segments wherein at least two portions of an individual intramolecularly heterogeneous chain, each portion comprising at least 5 weight percent of the chain and having a molecular weight of at least 7000 contain at least 5 wt. % ethylene and differ in composition from one another by at least 5 weight percent ethylene, wherein the intermolecular compositional dispersity of the polymer is such that 95 wt. % of the polymer chains have a composition 15% or less different in ethylene from the average weight percent ethylene composition, and wherein the copolymer is characterized by at least one or a ratio of $\overline{M_w}/\overline{M_n}$ of less than 2 and a ratio of $\overline{M_z}/\overline{M_w}$ of less than 1.8.

As described above, the copolymers will contain at least one crystallizable segment rich in methylene units (hereinafter called an "M" segment) and at least one low crystallinity ethylene-alpha-olefin copolymer segment (hereinafter called a "T" segment). The copolymers may be therefore illustrated by copolymers selected from the group consisting of copolymer chain structures having the following segment sequences:

$$M-T \tag{I}$$

$$T^1-(M-T^2)x, \text{ and} \tag{II}$$

$$T^1-(M^1-T^2)y-M^2 \tag{III}$$

wherein M and T are defined above, $M^1$ and $M^2$ can be the same or different and are each M segments, $T^1$ and $T^2$ can be the same or different and are each T segments, x is an integer of from 1 to 3 and y is an integer of 1 to 3.

In structure II (x=1), the copolymer's M segment is positioned between two T segments, and the M segment can be positioned substantially in the center of the polymer chain (that is, the $T^1$ and $T^2$ segments can be substantially the same molecular weight and the sum of the molecular weight of the $T^1$ and $T^2$ segments can be substantially equal to the molecular weight of the M segment), although this is not essential to the practice of this invention. Preferably, the copolymer will contain only one M segment per chain. Therefore, structures I and II (x=1) are preferred.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain.

As will be shown below, a copolymer of the structure $$M^1-(T-M^2)_z \tag{IV}$$

(wherein $M^1$, $M^2$ and T are as defined above, and wherein z is an integer of at least 1) are undesirable as viscosity modifier polymers. It has been found that solutions of structure IV copolymers in oil tend to gel even when the M and T portions have exactly the same composition and molecular weight as structure II copolymers (with x=z=1). It is believed this poor viscosity modifier performance is due to the inability of a center T segment to sterically stabilize against association.

The M segments of the copolymers of this invention comprise ethylene and can also comprise at least one other alpha-olefin, e.g., containing 3 to 18 carbon atoms. The T segments comprise ethylene and at least one other alpha-olefin, e.g., alpha-olefins containing 3 to 18 carbon atoms. The M and T segments can also comprise other polymerizable monomers, e.g., non-conjugated dienes or cyclic mono-olefins.

Since the present invention is considered to be most preferred in the context of ethylene-propylene (EPM) copolymers it will be described in detail in the context of EPM.

Copolymer (i)(a) in accordance with the present invention is preferably made in a tubular reactor. When produced in a tubular reactor with monomer feed only at the tube inlet, it is known at the beginning of the tubular reactor, ethylene, due to its high reactivity, will be preferentially polymerized. The concentration of monomers in solution changes along the tube in favor of propylene as the ethylene is depleted. The result, with monomer feed only at the inlet, is copolymer chains which are higher in ethylene concentration in the chain segments grown near the reactor inlet (as defined at the point at which the polymerization reaction commences), and higher in propylene concentration in the chain segments formed near the reactor outlet. These copolymer chains are therefore tapered in composition. An illustrative copolymer chain of ethylene-propylene is schematically presented below with E representing ethylene constituents and P representing propylene constituents in the chain:

```
            1              2              3           4
Segment: E—E—E—E—P—E—E—E—P—P—E—E—P—P—P—E—P—P—P—P
```

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule However, as subsequent segments are formed from left to right with the more reactive ethylene being depleted and the reaction mixture proportionately increasing in propylene concentration, the subsequent chain segments become more concentrated in propylene. The resulting chain is intramolecularly heterogeneous.

The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of inter-chain variation. The Inter-CD can be characterized by the difference in composition between the copolymer fractions containing the highest and lowest quantity of ethylene. Techniques for measuring the breadth of the Inter-CD are known as illustrated in "Polymerization of ethylene and propylene to amorphous copolymers with catalysts of vanadium oxychloride and alkyl aluminum halides"; E. Junghanns, A. Gumboldt and G. Bier; Makromol. Chem., V. 58 (12/12/62): 18–42, wherein a p-xylene/dimethylformamide solvent/non-solvent was used to fractionate copolymer into fractions of differing intermolecular composition. Other solvent/non-solvent systems can be used as hexane/2 propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 wt. %.

Broadly, the Intra-CD of copolymer in accordance with the present invention is such that at least two portions of an individual intramolecularly heterogeneous chain, each portion comprising at least 5 weight percent of the chain, differ in composition from one another by at least 7 weight percent ethylene Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

A  EEEEPEEEPEEEPPEEPPEPPPEPPPPPPP

B  EEEEPEEEPEEEPPEEEPPPEPPPEEPPP

C  EEPEEEPEEEPEEEPEEEPPEEPPPEEPPP

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%.

If the chains are broken into fragments, there will be a new Inter-CD. For simplicity, consider first breaking only molecule A into fragments shown by the slashes as follows:

EEEEP/EEEPE/EEPPE/EPPEP/-
PPEPP/PPPPP

Portions of 72.7%, 72.7%, 50%, 30.8%, 14.3% and 0% ethylene are obtained. If molecules B and C are similarly broken and the weight fractions of similar composition are grouped a new Inter-CD is obtained.

In order to determine the fraction of a polymer which is intramolecularly heterogeneous in a mixture of . polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about 105, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 and in H. Inagaki, T. Tanaku, "*Developments in Polymer Characterization*", 3, 1, (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Furthermore, for crystalline segments, solubility is significantly reduced. Thus, the high molecular weight, high ethylene chains are easily separated on the basis of thermodynamics.

A fractionation procedure is as follows: Unfragmented polymer is dissolved in n-hexane at 23° C. to form ca a 1% solution (1 g. polymer/100 cc hexane). Isopropyl alcohol is titrated into the solution until turbidity appears at which time the precipitate is allowed to settle. The supernatant liquid is removed and the precipitate is dried by pressing between Mylar. polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5-10% by weight of the original polymer, especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. (The time or temperature can be empirically adjusted based on the ethylene content and molecular weight of the polymer.) This should be adequate to reduce a 10⁵ molecular weight polymer to fragments of ca 5000 molecular weight. Such degradation does not substantially change the average ethylene content of the polymer, although propylene tends to be lost on scission in preference to ethylene. This polymer is fractionated by the same procedure as the high molecular weight precursor. Ethylene content is measured, as well as molecular weight on selected fractions.

The procedure to characterize intramolecular heterogeneity is laborious and even when performed at an absolute optimum, does not show how the segments of the chain are connected. In fact it is not possible, with current technology, to determine the polymer structure without recourse to the synthesis conditions. With knowledge of the synthesis conditions, the structure can be defined as follows.

Ethylene, propylene or high alpha-olefin polymerizations with transition metal catalysts can be described by the terminal copolymerization model, to an approximation adequate for the present purpose. (G. Ver Strate, *Encyclopedia of Polymer Science and Engineering*, vol. 6, 522 (1986)). In this model, the relative reactivity of the two monomers is specified by two reactivity ratios defined as follows:

$$R_1 = \frac{\text{(rate constant for ethylene adding to ethylene)}}{\text{(rate constant for propylene adding to ethylene)}}$$

$$R_2 = \frac{\text{(rate constant for propylene adding to propylene)}}{\text{(rate constant for ethylene adding to propylene)}}$$

Given these two constants, at a given temperature, the ratio of the molar amount of ethylene, E, to the molar amount of propylene, P, entering the chain from a solution containing ethylene and propylene at molar concentrations [E] and [P] respectively is $$E = [E] \cdot (R_1[E] + [P]) \quad (1)$$

$$P = [P] \cdot ([E] + R_2[P])$$

The relation of E and P to the weight % ethylene in the polymer is as follows $$\text{weight \% ethylene} = \frac{E}{E + 1.5 P} \cdot 100$$

The values of $R_1$ and $R_2$ are dependent on the particular comonomer and catalyst employed to prepare the polymer, the polymerization temperature and, to some extent, the solvent.

For all transition metal catalysts specified herein, $R_1$ is significantly larger than $R_2$. Thus, as can be seen from equation (1), ethylene will be consumed more rapidly than propylene for a given fraction of the monomer in the reacting medium. Thus, the ratio of [E]/[P] will decrease as the monomers are consumed. Only if $R_1 = R_2$ will the composition in the polymer equal that in the reacting medium.

If the amount of monomer that has reacted at a given time in a batch reactor or at a given point in a tubular reactor can be determined, it is possible through equation (1), to determine the instantaneous composition being formed at a given point along the polymer chain. Demonstration of narrow MWD and increasing MW along the tube proves the compositional distribution is intramolecular. The amount of polymer formed can be determined in either of two ways. Samples of the polymerizing solution may be collected, with appropriate quenching to terminate the reaction at various points along the reactor, and the amount of polymer formed evaluated. Alternatively, if the polymerization is run adiabatically and the heat of polymerization is known, the amount of monomer converted may be calculated from the reactor temperature profile.

Finally, if the average composition of the polymer is measured at a series of locations along the tube, or at various times in the batch polymerization case, it is possible to calculate the instantaneous composition of the polymer being made. This technique does not require knowledge of $R_1$ and $R_2$ or the heat of polymerization, but it does require access to the polymer synthesis step.

All of these methods have been employed with consistent results.

For the purpose of this patent, $R_1$ and $R_2$ thus simply serve to characterize the polymer composition in terms of the polymerization conditions. By defining $R_1$ and $R_2$, we are able to specify the intramolecular compositional distribution. In the examples shown below where $VCl_4$ and ethylaluminum sesquichloride are employed in hexane as solvent, $R_1 = 1.8 \exp(+500/RT_k)$ and $R_2 = 3.2 \exp(-1500/RT_k)$. Where "R" is the gas constant (1.98 col/deg-mole) and "$T_k$" is degrees Kelvin. For reference, at 20° C. $R_1 = 9.7$, $R_2 = 0.02$.

The $R_1$ and $R_2$ given above predict the correct final average polymer composition. If the $R_1$ and $R_2$ and expression (2) are someday proven to be inaccurate the polymer intramolecular compositional distribution will remain as defined herein in terms of the polymerization conditions but may have to be modified on the absolute composition scales. There is little likelihood that they are in error by more than a few percent, however.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are. available; however, proton and carbon-13 nuclear magnetic reasonance spectroscopy can be employed to determine the composition of such polymers. These are absolute techniques requiring no calibration when operated such that all nucleii of a given element contribute equally to the spectra. For ranges not covered by the ASTM tests for ethylene-propylene copolymers, these nuclear magnetic resonance methods can also be used.

Molecular weight and molecular weight distribution are measured using a Waters 150C gel permeation chromatography equipped with a Chromatix KMX-6 (LDC-Milton Roy, Riviera Beach, Fla.) on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, copolymers in accordance with the present invention are comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;

b. branched chain acyclic dienes such as: 5-methyl-1, 4-hexadiene; 3, 7-dimethyl-1,6-octadiene; 3, 7-dimethyl-1,7-octadiene and the mixed isomers of dihydro-myrcene and dihydroocinene;

c. single ring alicyclic dienes such as: 1, 4-cyclohexadiene; 1,5-cyclooctadiene; and 1,5-cyclododecadiene;

d. multi-ring alicyclic fused and bridged ring dienes such as: tetrahydroindene; methyltetrahydroindene; dicyclopentadiene; bicyclo-(2,2,1)-hepta-2, 5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene. The average ethylene content of the copolymer could be as low as about 20% on a weight basis. The preferred minimum is about 25%. A more preferred minimum is about 30%. The maximum ethylene content could be about 90% on a weight basis. The preferred maximum is about 85%, with the most preferred being about 80%. Preferably, the copolymers of this invention intended for use as viscosity modifier-dispersant contain from about 35 to 75 wt. % ethylene, and more preferably from about 50 to 70 wt. % ethylene.

The molecular weight of copolymer made in accordance with the present invention can vary over a wide range. It is believed that the weight-average molecular weight could be as low as about 2,000. The preferred minimum is about 10,000. The most preferred minimum is about 20,000. It is believed that the maximum weight-average molecular weight could be as high as about 12,000,000. The preferred maximum is about 1,000,000. The most preferred maximum is about 750,000. An especially preferred range of weight-average molecular weight for copolymers intended for use as V.M. polymer is from 50,000 to 500,000.

The copolymers of this invention will also be generally characterized by a Mooney viscosity (i.e., ML(1,+4,) 125° C.) of from about 1 to 100, preferably from about 5 to 70, and more preferably from about 8 to 65, and by a thickening efficiency ("T.E.") of from about 0.4 to 5.0, preferably from about 1.0 to 4.2, most preferably from about 1.4 to 3.9.

Another feature of copolymer of the present invention is that the molecular weight distribution (MWD) is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, a typical advantage of such copolymers having narrow MWD is resistance to shear degradation. Particularly for oil additive applications, the preferred copolymers have $\overline{M}_w/\overline{M}_n$ less than about 1.5, with less than about 1.25 being most preferred. The preferred $\overline{M}_z/\overline{M}_n$ is less than about 1.5, with less than about 1.2 being most preferred.

The copolymers of the instant invention may be produced by polymerization of a reaction mixture comprised of catalyst, ethylene and at least one additional alpha-olefin monomer, wherein the amounts of monomer, and preferably ethylene, is varied during the course of the polymerization in a controlled manner as will be hereinafter described. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons particularly hexane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These polymerizations are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product or chain segment. For economic reasons, a tubular reactor is preferred to a batch reactor for carrying out the processes of this invention.

In addition to the importance of the reactor system to make copolymers in accordance with the present invention, the polymerization should be conducted such that:
(a) the catalyst system produces essentially one active catalyst species,
(b) the reaction mixture is essentially free of chain transfer agents, and
(c) the polymer chains are essentially all initiated simultaneously, which is at the same time for a batch reactor or at the same point along the length of the tube for a tubular reactor.

To prepare copolymer structures II and III above (and, optionally, to prepare copolymer structure I above), additional solvent and reactants (e.g., at least one of the ethylene, alpha-olefin and diene) will be added either along the length of a tubular reactor or during the course of polymerization in a batch reactor, or to selected stages of stirred reactors in series in a controlled manner (as will be hereinafter described) to form the copolymers of this invention. However, it is necessary to add essentially all of the catalyst at the inlet of the tube or at the onset of batch reactor operation to meet the requirement that essentially all polymer chains are initiated simultaneously.

Accordingly, polymerization in accordance with the present invention are carried out:
(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Since the tubular reactor is the preferred reactor system for carrying out polymerizations in accordance with the present invention, the following illustrative descriptions are drawn to that system, but will apply to other reactor systems as will readily occur to the artisan having the benefit of the present disclosure.

In practicing polymerization processes in accordance with the present invention, use is preferably made of at least one tubular reactor. Thus, in its simplest form, such a process would make use of but a single, reactor. However, as would readily occur to the artisan having the benefit of the present disclosure, a series of reactors could be used with multiple monomer feed to vary intramolecular composition as described below.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture More specifically, it should yield one primary active catalyst species which provides for substantially all of the polymerization reaction Additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. Ver Strate, *Macromolecules*, 4, 482 (1971), which is incorporated herein by reference.

It is disclosed by the authors that copolymers made in a continuous flow stirred reactor should have an MWD characterized by $\bar{M}_w/\bar{M}_n = 2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight- to number-average ratio) for these samples approaches 2. It is this latter characteristic ($\bar{M}_w/\bar{M}_n$ of about 2) that is deemed the more important in identifying a single active catalyst species. On the other hand, other catalysts gave copolymer with an Inter-CD greater than ±10% about the average and multi-modal MWD often with $\bar{M}_w/\bar{M}_n$ greater than 10. These other catalysts are deemed to have more than one active species Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and an organo-aluminum compound, with the proviso that the catalyst yields essentially one active catalyst species as described above. At least one of the vanadium compound/organoaluminum pair selected must also contain a valence-bonded halogen.

In terms of formulas, vanadium compounds useful in practicing processes in accordance with the present invention could be:

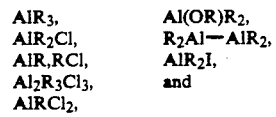

where $x = 0-3$ and $R$ = a hydrocarbon radical;

$VCl_4$;

$VO(AcAc)_2$,
where AcAc = acetyl acetonate which may or may not be alkyl-substituted (e.g. $_1$ to $C_6$ alkyl);

$V(AcAc)_3$;

V(dicarbonyl moiety)$_3$;
$VOCl_x(AcAc)_{3-x'}$
where $x = 1$ or 2;
V(dicarbonyl moiety)$_3$Cl; and
$VCl_3 \cdot nB$, where $n = 2-3$, B = Lewis base capable of making hydrocarbon-soluble complexes with $VCl_3$, such as tetrahydrofuran, 2-methyl-tetrahydrofuran and dimethyl pyridine, and the dicarbonyl moiety is derived from a dicarbonyl compound of the formula:

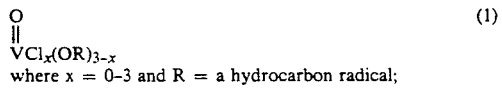

In formula (1) above, each R (which can be the same or different) preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. R, preferably represents an alkylene divalent radical of 1 to 6 carbons (e.g., $-CH_2-$, $-C_2H_4-$, etc.). Nonlimiting illustrative examples of formula (1) compounds are vanadyl trihalides, alkoxy halides and alkoxides such as $VOCl_3$, $VOCl_2$ (OBu) where Bu=butyl, and $VO(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

| | |
|---|---|
| $AlR_3$, | $Al(OR)R_2$, |
| $AlR_2Cl$, | $R_2Al-AlR_2$, |
| $AlR,RCl$, | $AlR_2I$, |
| $Al_2R_3Cl_3$, | and |
| $AlRCl_2$, | | where R and R, represent hydrocarbon radicals, the same or different, as described above with respect to the vanadium compound formula The most preferred organo-aluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\bar{M}_w/\bar{M}_n$ of the copolymer may rise above 2. Based on these considerations, the maximum Al/V could be about 25, however, a maximum of about 17 is more preferred. The most preferred maximum is about 15.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum cocatalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessively elevated temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 20° C. or below being most preferred.

Preferably, the catalyst components are premixed in the presence of the selected polymerization diluent or solvent under rapid mixing conditions, e.g., at impingement Reynolds Numbers (NRE) of at least 10,000, more preferably at least 50,000, and most preferably at least 100,000. Impingement Reynolds number is defined as $$N_{RE} = \frac{DN\rho}{\mu}$$

where N is fluid flow velocity (cm./sec.), D is inside tube diameter (cm), is $\rho$ fluid density (g./cm.3) and $\mu$ is fluid viscosity (poise).

The temperature of the reaction mixture should also be kept within certain limits. The temperature at the reactor inlets should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50° C. to 150° C. It is believed that the outlet temperature of the reaction mixture could be as high as about 200° C. The preferred maximum outlet temperature is about 70° C. The most preferred maximum is about 60° C. In the absence of reactor cooling, such as by a cooling jacket, to remove the heat of polymerization, it has been determined (for a mid-range ethylene content EP copolymer and a solvent with heat capacity similar to hexane) that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 wt %×13.C/wt. %=65° C. To maintain an outlet temperature of 35° C., it will thus require a feed that has been prechilled to 35° C.−65° C.=−30° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains but also to minimize radial temperature gradients due to the heat generated by the polymerization reaction. Radial temperature gradients in the case of multiple segment polymers will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 0.2 second. A preferred minimum is about 0.5 second. The most preferred minimum is about 1 second. It is believed that the maximum could be as high as about 3600 seconds. A preferred maximum is about 40 seconds. The most preferred maximum is about 20 seconds.

Preferably, the fluid flow of the polymerization reaction mass through the tubular reactor will be under turbulent conditions, e.g., at a flow Reynolds Number (NR) of at least 10,000, more preferably at least 50,000, and most preferably at least 100,000 (e.g., 150,000 to 250,000), to provide the desired radial mixing of the fluid in the reactor. Flow Reynolds Number is defined as $$NR = \frac{D'N'\rho}{\mu}$$

wherein $N'$ is fluid flow velocity (cm./sec.), D, is inside tube diameter of the reactor (cm.), $\rho$ is fluid density (g./cm.$^3$) and $\mu$ is fluid viscosity (poise).

If desired, catalyst activators for the selected vanadium catalysts can be used as long as they do not cause the criteria for a mix-free reactor to be violated, typically in amounts up to 20 mol %, generally up to 5 mol %, based on the vanadium catalyst, e.g., butyl perchlorocrotonate, benzoyl chloride, and other activators disclosed in Ser. Nos. 504,945 and 50,946, filed May 15, 1987, the disclosures of which are hereby incorporated by reference in their entirety. Other useful catalyst activators include esters of halogenated organic acids, particularly alkyl trichloroacetates, alkyl tribromoacetates, esters of ethylene glycol monoalkyl (particularly monoethyl) ethers with trichloroacetic acid and alkyl perchlorocrotonates, and acyl halides. Specific examples of these compounds include benzoyl chloride, methyl trichloroacetate, ethyl trichloroacetate, methyl tribromoacetate, ethyl tribromoacetate, ethylene glycol monoethyl ether trichloroacetate, ethylene glycol monoethyl ether tribromoacetate, butyl perchlorocrotonate and methyl perchlorocrotonate.

By practicing processes in accordance with the present invention, alpha-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPM and EPDM made in accordance with the present invention, the products have good shear stability and (with specific intramolecular CD) excellent low temperature properties which make them especially suitable for lube oil applications.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene. Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

The particularly preferred copolymers of this invention are those that have a weight average molecular weight of from about 20,000 to about 250,000.

GRAFTING MATERIALS

The materials or compounds, defined as (ii) hereinafore, that are grafted on the ethylene copolymer backbone to form the grafted ethylene polymers of the instant invention are those materials that can be grafted onto said ethylene copolymers to form the grafted ethylene copolymers, which grafted copolymers are then reacted with (iii) (A) polyamines containing at least two reactive amino groups to form the nitrogen containing grafted ethylene copolymers, or with (iii) (B) polyols to form the ester containing grafted ethylene copolymers. These materials preferably contain olefinic unsaturation and further preferably contain at least one of carboxylic acid moiety, ester moiety, or anhydride moiety. The olefinically unsaturated portion, i.e., ethylenically unsaturated portion, is one which is capable of reacting with the ethylene copolymer backbone, and upon reaction therewith becomes saturated.

These materials are generally well known in the art as grafting materials and are generally commercially available or may be readily prepared by well known conventional methods.

The preferred grafting materials are the carboxylic acid materials. The carboxylic acid material which is grafted to or reacted with the ethylene copolymer to form the grafted ethylene copolymer is preferably ethylenically unsaturated, preferably monounsaturated, carboxylic acid material and can be either a monocarboxylic or dicarboxylic acid material. The dicarboxylic acid materials include (1) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; and (2) derivatives of (1) such as anhydrides or $C_1$ to $C_5$ alcohol derived mono- or diesters of (1). Upon reaction with the ethylene copolymer the monounsaturation of the dicarboxylic acid, anhydride, or ester becomes saturated. Thus, for example, maleic anhydride becomes an ethylene copolymer substituted succinic anhydride.

The monocarboxylic acid materials include (1) monounsaturated $C_3$ to $C_{10}$ monocarboxylic acid wherein the carbon-carbon bond is conjugated to the carboxy group, i.e., of the structure

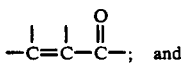

and (2) derivatives of (1) such as $C_1$ to $C_5$ alcohol derived monoesters of (1). Upon reaction with the ethylene copolymer, the monounsaturation of the monounsaturated carboxylic acid material becomes saturated. Thus, for example, acrylic acid becomes an ethylene copolymer substituted propionic acid, and methacrylic acid becomes an ethylene copolymer substituted isobutyric acid.

Exemplary of such unsaturated mono- and dicarboxylic acids, or anhydrides and thereof include fumaric acid, itaconic acid, maleic acid, maleic anhydride, chloromaleic anhydride, acrylic acid, methacrylic acid, crotonic acid, cinnamic acid, methyl acrylate, ethyl acrylate, methyl methacrylate, etc.

Preferred carboxylic acid materials are the dicarboxylic acid anhydrides. Maleic anhydride or a derivative thereof is particularly preferred as it does not appear to homopolymerize appreciably but grafts onto the ethylene copolymer to give two carboxylic acid functionalities. Such preferred materials have the generic formula

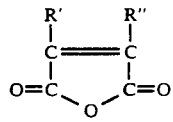

wherein R' and R" are independently hydrogen or a halogen.

Additionally, as taught by U.S. Pat. Nos. 4,160,739 and 4,161,452, both of which are incorporated herein by reference, various unsaturated comonomers may be grafted on the ethylene copolymer together with the unsaturated carboxylic acid material. Such graft monomer systems may comprise one or a mixture of comonomers different from said unsaturated carboxylic acid material, and which contain only one copolymerizable double bond and are copolymerizable with said unsaturated acid component.

Typically, such comonomers do not contain free carboxylic acid groups and are esters containing alpha-ethylenic unsaturation in the acid or alcohol portion; hydrocarbons, both aliphatic and aromatic, containing, alpha-ethylenic unsaturation, such as the $C_4$–$C_{12}$ alpha olefins, for example hexene, nonene, dodecene, etc.; styrenes, for example styrene, alpha-methyl styrene, p-methyl styrene, butyl styrene, etc.; and vinyl monomers, for example vinyl acetate, vinyl chloride, vinyl ketones such as methyl and ethyl vinyl ketone, and nitrogen containing vinyl monomer such as vinyl pyridine and vinyl pyrrolidine, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated carboxylic acid material monomer component to comonomer component of about 1:4 to 4:1, preferably about 12 to 2:1 by weight.

Grafting of the Ethylene Copolymer

Grafting of the ethylene copolymer with the grafting material may be conducted by either conventional grafting processes or by a process which does not substantially adversely affect (substantially broaden) the narrow MWD of the ethylene copolymer, e.g., relatively low temperature and/or low shear process. While not wishing to be bound by any theory, it is believed that the reaction of the polyamine containing at least two reactive amino groups to form the nitrogen containing grafted ethylene copolymer or with the polyol to form the ester containing grafted ethylene copolymer produces a product having a broader molecular weight distribution than that of the ethylene copolymer. Thus, even if the grafted ethylene copolymer is produced by a process which does not substantially broaden the MWD, the reaction of this narrow MWD grafted ethylene copolymer with the polyamine containing at least two reactive amino groups or with the polyol with result in a product having a broadened MWD.

In the grafting process which does not substantially adversely affect or broaden the narrow MWD of the ethylene copolymer the grafting conditions, particularly temperature, are such that the narrow MWD as defined herein of the ethylene copolymer reactant is not substantially adversely affected, i.e., is not substantially broadened. For the purposes of this application the MWD is considered to be substantially broadened if the difference in MWD between the ungrafted ethylene-alpha-olefin copolymer and the grafted ethylene-alpha-olefin copolymer is greater than about 10%. That is to say the grafting conditions are those which are effective to yield a graft copolymer which contains an ethylene copolymer backbone having substantially the same of similar MWD distribution as the ethylene copolymer reactant. By substantially the same or similar MWD is meant a MWD which is about 10% or less different from the MWD of the ungrafted ethylene-alpha-olefin copolymer, i.e., the difference between the MWD of ungrafted ethylene-alpha-olefin copolymer and grafted ethylene-alpha-olefin copolymer is about 10% or less. If a high shear and/or high temperature grafting method such as extruder grafting is utilized the narrow MWD, as defined hereinafore, of the ethylene copolymer is substantially adversely affected, i.e., is substantially broadened. That is to say the resultant grafted ethylene copolymer no longer has the narrow MWD and the microstructure (intramolecular heterogeneity) of the ungrafted ethylene copolymer.

Generally, the grafting conditions used to graft the grafting material, e.g., maleic anhydride, onto the ethylene-alpha-olefin copolymer depend, to a degree, upon the MWD of the ungrafted ethylene-alpha-olefin copolymer reactant. In general, the narrower the MWD of the ungrafted copolymer reactant the milder the grafting conditions, i.e., temperature and/or shear, that are utilized to produce a grafted ethylene-alpha-olefin copolymer having a MWD which differs 10% or less from the MWD of the ungrafted ethylene-alpha-olefin copolymer reactant. Thus, with ungrafted ethylene-alpha-olefin copolymers having a broader MWD harsher grafting conditions, i.e., higher temperatures and/or greater shear, can be used than with ungrafted copolymers having a lower MWD to produce grafted ethylene-alpha-olefin copolymers having substantially the same or similar microstructure (intramolecular heterogeneity) as the ungrafted ethylene-alpha-olefin copolymer and having a MWD which differs, e.g., is broader, from the MWD of the ungrafted ethylene-alpha-olefin copolymer reactant by no more than about 10%. Generally, grafting is carried out at temperatures below about 225° C., preferably below about 200° C., more preferably below about 190° C., and more preferably below about 180° C. in order to produce a grafted copolymer having this narrow MWD. Higher temperatures will result in a grafted polymer wherein the backbone portion no longer has the substantially narrow MWD as described herein.

The conventional grafting of the ethylene copolymer with the grafting material such as carboxylic acid material may be by any suitable and well-known conventional method such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. The initiator is generally used at a level of between about 0.005% and about 1%, based on the total weight of the polymer solution, and temperatures of about 150° to 250° C., preferably from about 150° C. to about 220° C. are used.

The ethylenically unsaturated carboxylic acid material, such as maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

In the practice of the instant invention when these ethylenically unsaturated grafting materials are grafted onto the aforedescribed ethylene copolymer the resultant grafted copolymer contains the residue of the ethylene copolymer as the backbone and the residue of the ethylenically unsaturated grafting material as the grafted moiety. By residues is meant the respective moieties produced by and remaining after the grafting process or reaction. Thus, for example, while the ethylenically unsaturated grafting material may be maleic anhydride, after the grafting reaction it is the succinic anhydride moiety that is grafted or attached to the ethylene copolymer backbone. Thus, this succinic anhydride moiety is referred to herein as the residue of the ethylenically unsaturated grafting material, i.e., residue of maleic anhydride.

A preferred method of grafting is by free-radical induced grafting in solvent, preferably in a mineral lubricating oil as solvent. The free-radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are asobutyro-nitrile, 2,5-di-methyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said grafting material such as unsaturated carboxylic acid material and initiator are added with agitation, although they could have been added prior to heating. When the reaction is complete, the excess grafting material can be eliminated by an inert gas purge, e.g. nitrogen sparging. Preferably the grafting material such as carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer mineral lubricating oil solution. Continuous or periodic addition of the grafting material such as carboxylic acid material along with an appropriate portion of initiator, during the course of the reaction, can be utilized to maintain the grafting material such as carboxylic acid material below its solubility limits, while still obtaining the desired degree of total grafting In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the polyamine or polyol and as a solvent for the end product to form the lubricating additive concentrate.

The solution grafting step when carried out in the presence of a high temperature decomposable peroxide can be accomplished without substantial degradation of the chain length (molecular weight) of the ethylene containing polymer. This can be an advantage as opposed to high temperature thermal reactions which depend on degradation to apparently form free radical reactive sites Measurement of molecular weights and degradation can be evaluated by determination of the thickening efficiency (T.E.) of the polymer as will later be described, and by GPC.

The amount of grafting material such as carboxylic acid material used in the grafting reaction is an amount which is effective to provide a grafted ethylene copolymer which upon further reaction with a polyamine or polyol as described hereinafter provides a material exhibiting the properties of a multifunctional viscosity index improver additive, more specifically a viscosity index improver-dispersant additive, i.e., a material having both V.I. improving and dispersancy properties in an oleaginous composition. That is to say, an amount which is effective to provide, upon reaction of the grafted ethylene copolymer with the polyamine or polyol, an oleaginous composition exhibiting improved viscometric and dispersancy properties. Generally, this amount of grafting material, e.g., moles of carboxylic acid material such as maleic anhydride, is an amount which is effective to provide a grafted ethylene copolymer, e.g., ethylene-alpha-olefin substituted carboxylic acid material such as ethylene-propylene substituted succinic anhydride, containing an average number of acid material moieties, e.g., succinic anhydride, grafted to or present on a 10,000 number average molecular weight segment of a mole of ethylene copolymer of at least about 0.1, preferably at least about 0.5, and more preferably at least about 1. The maximum average number of grafted moieties present per 10,000 average number molecular weight segment of a mole of ethylene copolymer backbone should not exceed about 10, preferably about 7 and more preferably about 5. Preferably, the average number, moles, of grafted moieties present per mole of ethylene copolymer backbone is at least about 0.6, preferably at least about 0 8, and more preferably at least about 1. Preferably, the maximum average number of grafted moieties grafted to or present per mole of ethylene copolymer backbone should generally not exceed about 10, preferably about 7, and more preferably about 5. Thus, for example, a mole of grafted ethylene copolymer, e.g., ethylene-propylene substituted succinic anhydride, containing an ethylene copolymer backbone such as an ethylene- propylene backbone having an average number molecular weight of 50,000 contains grafted to said backbone an average number of succinic anhydride moieties of from about 0.5 to about 50, preferably from about 0.6 to about 10. Typically, from about 0.2 to about 12, preferably from about 0.4 to about 6 moles of said carboxylic acid material are charged to the reactor per mole of ethylene copolymer charged.

Normally, not all of the ethylene copolymer reacts with the carboxylic acid material, e.g., maleic anhydride, to produce a grafted ethylene copolymer, e.g., ethylene-propylene substituted succinic anhydride. The resultant reaction product mixture, therefore, contains reacted or grafted ethylene copolymer, e.g., ethylene-propylene substituted succinic anhydride, unreacted or ungrafted ethylene copolymer, and unreacted grafting material, e.g., maleic anhydride. The unreacted ethylene copolymer is typically not removed from the reaction product mixture, and the reaction product mixture, generally stripped of any unreacted grafting material, is utilized as is or is employed for further reaction with the amine as described hereinafter.

Characterization of the average number of moles of grafting material such as carboxylic acid material, e.g., maleic anhydride, which have reacted per mole of ethylene copolymer charged to the reaction (whether it has undergone reaction or not) is defined herein as the average number of grafted moieties grafted to or present per mole of ethylene copolymer the resulting reaction product mixture can be subsequently modified, i.e., increased or decreased by techniques known in the art, such modifications do not alter the average number of grafted moieties as defined above. The term grafted ethylene copolymer is intended to refer to the reaction product mixture whether it has undergone such modification or not.

The grafted, preferably acid material grafted, ethylene copolymer is reacted with a polyamine or polyol to form the nitrogen or ester containing grafted ethylene copolymers of the instant invention. When the grafted ethylene copolymer is reacted with a polyamine the resultant product is a nitrogen containing grafted ethylene copolymer.

The Polyamine

The polyamine which is reacted with the grafted ethylene copolymer has two or more reactive amino groups selected from primary amino groups, secondary amino groups and mixtures thereof, preferably primary amino groups. Such polyamines are well known in the art and are described inter alia in U.S. Pat. Nos. 4,234,435; 3,804,763 and 3,948,800, all of which are incorporated herein by reference.

Preferred polyamines include the aliphatic saturated amines, including those of the general formulae:

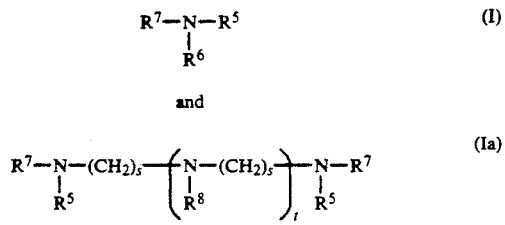

wherein $R^7$, $R^5$, $R^6$, and $R^8$ are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and wherein $R^6$ and $R^8$ can additionally comprise a moiety of the formula

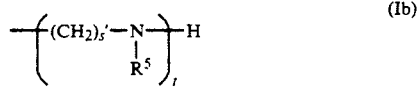

wherein $R^5$ is as defined above, and wherein each s and s' can be the same or a different number of from 2 to 6, preferably 2 to 4; and t and t' can be the same or different and are each numbers of typically from 0 to 10, preferably about 2 to 7, most preferably about 3 to 7, with the proviso that t+t' is not greater than 10. To assure a facile reaction it is preferred that $R^7$, $R^5$, $R^6$, $R^8$, (s), (s'), (t) and (t') be selected in a manner sufficient to provide the compounds of formula Ia with typically at least two primary amino groups. This can be achieved by selecting at least one of said $R^7$, $R^6$, or $R^8$ groups to be hydrogen or by letting (t) in formula Ia be at least one when $R^8$ is H or when the (Ib) moiety possesses a primary amino group.

Non-limiting examples of suitable polyamine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-1, 3-diaminopropane; N,N-di-(2-aminoethyl) ethylene diamine; N,N-di(2-hydroxyethyl)-1,3-propylene diamine; N-dodecyl-1,3-propane diamine; and mixtures thereof.

Other useful amine compounds include: alicyclic diamines such as 1,4-di(aminoethyl) cyclohexane, and N-aminoalkyl piperazines of the general formula:

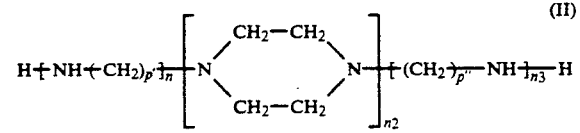

wherein p' and p" are the same or different and are each integers of from 1 to 4, and $n_1$, $n_2$ and $n_3$ are the same or different and are each integers of from 1 to 3.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

where m has a value of about 3 to 70 and preferably 10 to 5; and

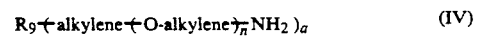

that the sum of all the n's is from about 3 to about 70, and preferably from about 6 to about 35, and $R^9$ is a substituted saturated hydrocarbon radical of up to 10 carbon atoms, wherein the number of substituents on the $R^9$ group is from 3 to 6, and "a" is a number from 3 to 6 which represents the number of substituents on $R^9$. The alkylene groups in either formula (III) or (IV) may be straight or branched chains containing about 2 to 7, and preferably about 2 to 4 carbon atoms.

Particularly preferred polyamine compounds are the polyoxyalkylene polyamines of Formulae III and IV, and the alkylene polyamines represented by the formula

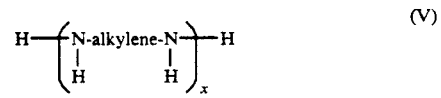

wherein x is an integer of about 1 to 10, preferably about 2 to 7, and the alkylene radical is a straight or branched chain alkylene radical having 2 to 7, preferably about 2 to 4 carbon atoms.

Examples of the alkylene polyamines of formula (V) include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(-heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis-(2-aminopropyl)imidazoline, pyrimidine, 1-(2-aminopropyl)piperazine, 1,4-bis(2-aminoethyl)piperazine, N,N'-dimethyaminopropyl amine, N,N'-dioctylethyl amine, N-octyl-N'-methylethylene diamine, 2-methyl-1-(2-aminobutyl)piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898-905; Interscience Publishers, New York (1950), incorporated herein by reference. These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formulae III and IV, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and the polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Included within the scope of the term polyamines are the hydroxyalkyl polyamines, particularly the hydroxyalkyl alkylene polyamines, having one or more hydroxyalkyl substituents on the nitrogen atoms. Preferred hydroxyalkyl-substituted alkylene polyamines are those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N-bis(2-hydroxyethyl)ethylene diamine, 1-(2-hydroxyethyl)piperazine, monohydroxy-propyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxy alkylene polyamines through amino radicals or through hydroxy radicals are likewise useful. Condensation through amino radicals results in a higher amine accompanied by removal of ammonia and condensation through the hydroxy radicals results in products containing ether linkages accompanied by removal of water.

In another aspect of the instant invention the grafted ethylene copolymer may be reacted with a polyol to form an ester containing grafted ethylene copolymer instead of with the polyamine to form a nitrogen containing grafted ethylene copolymer.

Polyol

The polyols which are reacted with the grafted ethylene copolymers are well known in the art and are described, inter alia, in U.S. Pat. No. 4,234,435, incorporated herein by reference. Suitable polyol compounds which can be used include aliphatic polyhydric alcohols containing up to about 100 carbon atoms and about 2 to about 10 hydroxyl groups. These alcohols can be quite diverse in structure and chemical composition, for example, they can be substituted or unsubstituted, hindered or unhindered, branched chain or straight chain, etc. as desired. Typical alcohols are alkylene glycols such as ethylene glycol, propylene glycol, trimethylene glycol, butylene glycol, and polyglycols such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexanediol, pinacol, tetrahydroxy pentane, erythritol, arabitol, sorbitol, mannitol, 1,2-cyclohexane, 1,4-dihydroxy-2-nitrobutane, 1,4-di-(2-hydroxyethyl)-benzene, and the carbohydrates such as glucose, mannose, glyceraldehyde, galactose, and the like.

A preferred class of aliphatic alcohols are those containing up to 20 carbon atoms, and especially those containing three to 15 carbon atoms. This class of alcohols includes glycerol, erythritol, pentaerythritol, dipentaerythritol, tripentaerythritol, gluconic acid,-glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6,-tetrakis(hydroxymethyl)cyclohexanol, 1,10-decanediol, and the like.

An especially preferred class of polyhydric alcohols are the polyhydric alkanols containing three to 15, especially three to six carbon atoms and having at least three hydroxyl groups. Such alkanols are exemplified in the above specifically identified alcohols and are represented by glycerol, erythritol, pentaerythritol, mannitol, sorbitol, 1,2,4-hexanetriol, and tetrahydroxy pentane and the like.

In another embodiment of the instant invention the grafted ethylene copolymer instead of being reacted with only the polyamine or polyol is reacted in a reaction mixture containing (i) a carboxylic acid component and said polyamine or polyol, or (ii) the preformed reaction products, e.g., salts, imides, esters, amides, etc., of a carboxylic acid component and the polyamine or polyol. Thus, for example a reaction mixture containing the grafted ethylene copolymer, e.g., ethylene-propylene substituted succinic anhydride, and carboxylic acid component, e.g., polyisobutenyl substituted succinic anhydride, is prepared by admixing these two reactants, and the polyamine is then introduced into this reaction mixture and the reaction is carried out as described hereinafter. Alternatively, the carboxylic acid component and polyamine may be added substantially simultaneously to a reaction mixture containing the grafted ethylene copolymer.

Carboxylic Acid Component

The carboxylic acid component includes: hydrocarbyl substituted dicarboxylic acid or anhydride, preferably succinic anhydride or acid, having 12 to 49 carbons, preferably 16 to 49 carbons in said hydrocarbyl group; long chain monocarboxylic acid of the formula $R^{10}COOH$ where $R^{10}$ is a hydrocarbyl group of 50 to 400 carbons and long chain hydrocarbyl substituted dicarboxylic acid or anhydride, preferably succinic anhydride or acid, having from about 50 to about 400 carbons in said hydrocarbyl group. The preferred carboxylic acid component is the long chain hydrocarbyl substituted dicarboxylic acid or anhydride, preferably succinic acid or anhydride, having from about 50 to about 400 carbon atoms in said hydrocarbyl group. Said hydrocarbyl groups are essentially aliphatic and include alkenyl and alkyl groups. The longer chain acids and anhydrides are preferred, particularly when the grafting reaction is carried out in lubricating oil.

The about $C_{50}$–$C_{400}$ hydrocarbyl subtituted dicarboxylic acid or anhydride includes the reaction product of the $C_{50}$–$C_{400}$ hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; or with (ii) derivatives of (i) such as anhydrides of (i). Upon reaction with the hydrocarbon polymer, the monounsaturation of the dicarboxylic acid, anhydride, etc. becomes saturated. Thus for example, maleic anhydride becomes a hydrocarbyl substituted succinic anhydride.

Typically, from about 0.7 to about 4.0 (e.g., 0.8 to 2.6), preferably from about 1.0 to about 2.0, and most preferably from about 1.1 to about 1.7 moles of said unsaturated $C_4$ to $C_{10}$ dicarboxylic acid, anhydride or ester are charged to the reactor per mole of polyolefin charged.

Normally, not all of the polyolefin reacts with the unsaturated acid or derivative and the hydrocarbyl substituted dicarboxylic acid material will contain unreacted polyolefin. The unreacted polyolefin is typically not removed from the reaction mixture (because such removal is difficult and would be commercially infeasible) and the product mixture, stripped of any unreacted monounsaturated $C_4$ to $C_{10}$ dicarboxylic acid or anhydride, is employed as the carboxylic acid component.

Characterization of the average number of moles of dicarboxylic acid or anhydride, which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polyolefin contained in the resulting product mixture can be subsequently modified, i.e., increased or decreased by techniques known in the art, such modifications do not alter functionality as defined above. The term $C_{50}$–$C_{400}$ hydrocarbyl substituted dicarboxylic acid material is intended to refer to the product mixture whether it has undergone such modification or not.

Accordingly the functionality of the $C_{50}$–$C_{400}$ hydrocarbyl substituted dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such unsaturated dicarboxylic acids or anhydrides thereof are fumaric acid, itaconic acid, maleic acid, maleic anhydride, chloromaleic acid, chloromaleic anhydride, etc.

Preferred about $C_{50}$ to about $C_{400}$ olefin polymers for reaction with the unsaturated dicarboxylic acids or derivatives thereof are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used will usually have number average molecular weights within the range of about 700 and about 5,600, more usually between about 800 and about 3000. Particularly useful olefin polymers have number average molecular weights within the range of about 900 and about 2500 with approximately one terminal double bond per polymer chain. An especially useful starting material is polyisobutylene. The number average molecular weight for such polymers can be determined by several known techniques. A convenient method for such determination is by gel permeation chromatography (GPC) which additionally W. Yau, J. J. Kirkland and D> D. Bly, "Modern Size Exclusion Liquid Chromatography", John WIley and Sons, New York, 1979.

Processes for reacting the about $C_{50}$ to about $C_{400}$ olefin polymer with the $C_{4-10}$ unsaturated dicarboxylic acid or anhydride are known in the art. For example, the olefin polymer and the dicarboxylic acid or derivative may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C., for about 0.5 to 10, preferably 1 to 7 hours. The halogenated polymer may then be reacted with sufficient unsaturated acid or derivative at 100° to 250° C., usually about 180° to 235° C., for about 0.5 to 10, e.g. 3 to 8 hours, so the product obtained will contain the desired number of moles of the unsaturated acid or derivative per mole of the halogenated polymer. Processes of this general type are taught in U.S. Pat. Nos. 3,087,936; 3,172,892; 3,272,746 and others.

Alternatively, the olefin polymer, and the unsaturated acid or derivative are mixed and heated while adding chlorine to the hot material. Processes of this type are disclosed in U.S. Pat. Nos. 3,215,707; 3,231,587; 3,912,764; 4,110,349; and in U.K. 1,550,219.

By the use of halogen, about 65 to 95 wt. % of the polyolefin, e.g. polyisobutylene will normally reacted with the dicarboxylic acid or derivative. Upon carrying out a thermal reaction without the use of halogen or a catalyst, then usually only about 50 to 75 wt. % of the polyisobutylene will react. Chlorination helps increased the reactivity.

Particularly preferred as the acid component is polyisobutenyl succinic anhydride.

Prereacted Amine or Polyol-Carboxylic Acid Component

The aforementioned polyamine or polyol and carboxylic acid component may be prereacted, with the acid being generally attached to the polyamine or polyol through salt, imide, amide, amidine, ester or other linkages so that a primary amino group of the polyamine or a hydroxyl group of the polyol is still available for reaction with the acid or anhydride moieties of the grafted ethylene copolymer. A convenient source of these preacted materials are the well-known and generally commercially available lubricating oil dispersants, provided they retain primary amino groups or hydroxyl groups capable of further reaction with the grafted copolymer.

Usually these dispersants are made by condensing a hydrocarbyl substituted dicarboxylic acid or anhydride, preferably one having about 50 to 400 carbons in the hydrocarbyl substituent, such as these described hereinafore under "Carboxylic Acid Component", preferably a succinic acid producing material such as alkenyl succinic anhydride, with a polyamine or polyol, including those described above under "Polyamines" or "Polyols."

Monocarboxylic acid dispersants have been described in U.K. Patent Specification 983,040. There, polyamines are reacted with the high molecular weight mono carboxylic acid derived from a polyolefin, such as polyisobutylene, by oxidation with nitric acid or oxygen; or by addition of halogen to the polyolefin followed by hydrolyzing and oxidation; etc. Another method is taught in Belgian Patent 658,236, incorporated herein by reference where polyolefin, such as the polymers of $C_2$ to $C_5$ monoolefin, e.g., polypropylene or polyisobutylene, is halogenated, e.g., chlorinated, and then condensed with an alpha, beta-unsaturated, monocarboxylic acid of from 3 to 8, preferably 3 to 4, carbon atoms, e.g., acrylic acid, alpha-methyl-acrylic acid, i.e., 2-methyl propenoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc., is well known in the art, as seen in U.S. Pat. No. 3,272,746, incorporated herein by reference.

Most preferred are the lubricating oil dispersants made by reaction of the aforesaid alkylene polyamines anhydrides described hereinafore.

Reaction, preferably amination and/or imidation of the carboxylic acid material is usefully done as a solution reaction with the acid material, usually polyisobutenyl-succinic anhydride, dissolved in a solvent such as mineral oil, to which the other reactant is added. The formation of the dispersants in high yield can be effected by adding from about 0.5 to 3.3, preferably about 0.7 to 1.3, most preferably about 1 to 1 molar proportions of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final acyl nitrogen compound solution.

Reaction of Grafted Ethylene Copolymer with Polyamine or Polyol

The grafted ethylene copolymer, preferably in solution generally equal to about 5 to 30 wt. %, preferably 10 to 20 wt. % polymer, can be readily reacted with a polyamine, mixture of polyamine and carboxylic acid component; pre-reacted polyamine and carboxylic acid component; polyol; a mixture of polyol and carboxylic acid component; or with pre-reacted polyol and carboxylic acid component, by admixture and heating at a temperature of from about 100° C. to 250° C., preferably from 150° to 200° C., for from about 0.1 to 10 hours, usually about 0.1 to about 2 hours. In the case of polyamines the heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water, e.g., by $N_2$ stripping during slow addition of amine with stirring, assures completion of the imidation reaction. Reaction ratios can vary considerably, depending upon the reactants, amounts of excess, type of bonds formed, etc. Generally, the amount of polyamine used is an amount which is effective or sufficient to provide from about 0.5 to about 2.5, preferably from about 0.8 to about 1.2 and more preferably from about 0.9 to about 1.0 equivalents of reactive primary amine moiety per acid equivalent of the grafted acid moiety of the grafted ethylene copolymer, e.g., succinic anhydride. If a polyol is used in place of the polyamine generally the amount of polyol reactant used is an amount which is effective or sufficient to provide from about 0.5 to about 2.5, preferably from about 0.8 to about 1.2, and more preferably from about 0.9 to about 1.0 equivalents of reactive hydroxyl moiety per acid equivalent of the grafted acid moiety of the grafted ethylene copolymer. The amount of carboxylic acid component used is generally from about 0.5 to about 4, preferably from about 1.0 to 3 mole equivalents per mole equivalent of the grafted acid moiety content, e.g., succinic anhydride content, of the grafted ethylene copolymer.

Alternately, if pre-reacted polyamine and carboxylic acid component is used, such as a dispersant, sufficient dispersant is used to provide from about 0.5 to about 2.5 preferably from about 0.8 to about 1.2, and more preferably from about 0.9 to about 1.0 equivalents of reactive primary amine moiety per acid equivalent of the grafted acid moiety of the grafted ethylene copolymer. Likewise, if pre-reacted polyol and carboxylic acid component is used, such as a dispersant, sufficient dispersant is used to provide from about 0.5 to about 2.5, preferably from about 0.8 to about 1.2, and more preferably from 0.9 to about 1.0 equivalents of reactive hydroxyl moiety per acid equivalent of the grafted dicarboxylic acid moiety of the grafted ethylene copolymer.

Under certain conditions, particularly upon storage, oleaginous compositions, particularly oil concentrates, containing the multifunctional viscosity index improver additives of the instant invention may exhibit an increase in viscosity. This viscosity increase appears to be due, at least in part, to chain extension and/or crosslinking of the nitrogen or ester containing grafted ethylene copolymer of the instant invention. In order to stabilize the viscosity and retard or inhibit said viscosity increase of these oil compositions the nitrogen or ester containing grafted ethylene copolymers of the instant invention can be treated or post-reacted with a variety of materials, particularly acid materials, to inactivate the remaining reactive primary amino groups or hydroxyl groups. This treatment prevents, diminishes, or retards chain-extension and/or crosslinking of the nitrogen or ester containing grafted ethylene copolymer adduct. Thus, for example, the adducts may be reacted or post-treated with $C_1$–$C_{30}$ monocarboxylic acids or anhydrides, preferably acetic anhydride, or unsubstituted or $C_1$ to $C_{28}$ hydrocarbyl substituted dicarboxylic acid anhydrides as disclosed in U.S. Pat. No. 4,137,185, incorporated herein by reference; the sulfonic acids of U.S. Pat. No. 4,144,181, incorporated herein by reference; and the $C_{12}$ to $C_{18}$ hydrocarbyl substituted dicarboxylic anhydrides, preferably $C_{12}$ to $C_{18}$ hydrocarbyl substituted succinic anhydride, of U.S. Pat. No. 4,803,003, incorporated herein by reference.

Preferred viscosity stabilizing materials are those disclosed in U.S. Pat. No. 4,803,003, i.e., the $C_{12}$ to about $C_{18}$ hydrocarbyl substituted dicarboxylic anhydrides. These anhydrides may be represented by the general formula $R^{11}X$ wherein $R^{11}$ is a hydrocarbyl group containing a total of from 12 to about 18, preferably 12 to 16, more preferably 12 to 14, and most preferably 12 carbons, which are essentially aliphatic, saturated or unsaturated, and include alkenyl groups, alkyl groups, and mixtures of alkenyl groups and alkyl groups, preferably alkenyl groups, and can be straight chain or branched. When $R^{11}$ is an alkenyl group it is preferred that the olefinic unsaturation site be located near the anhydride, e.g., allylic to X, moiety. The radical X will usually contain 4 to 10, preferably 4 to 8, more preferably 4 to 6, and most preferably 4 carbon atoms and will define a dicarboxylic anhydride. The X radical may be represented by the formula

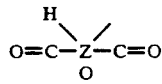

wherein Z is selected from alkylene and alkenylene radicals containing from 2 to 8, preferably 2 to 6, more preferably 2 to 4, and most preferably 2 carbon atoms. Preferably Z is an alkylene radical. The most preferred X radical is the succinic anhydride radical, i.e.,

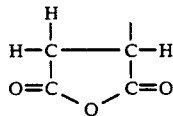

The X radical is linked to the $R^{11}$ group by a carbon to carbon linkage.

The amount of the hydrocarbyl substituted dicarboxylic acid anhydride component utilized is a viscosity stabilizing effective amount. By viscosity stabilizing effective amount is meant any amount which is effective to stabilize the viscosity of an oleaginous solution of the derivatized ethylene copolymers, i.e., inhibit or retard the increase in viscosity over an extended period of time of an oil solution, particularly an oil concentrate, of the nitrogen containing grafted ethylene copolymers. Generally this amount is from about 0.5-2.5, preferably 1-1.5 moles of $C_{12}$ to about $C_{18}$ hydrocarbyl substituted dicarboxylic acid anhydride per mole of unreacted reactive amino group, i.e., secondary and/or primary amino group, of the ethylene copolymer grafted with a carboxylic acid material and thereafter reacted with the polyamine.

The chain extension termination or end-capping of the nitrogen or ester containing grafted ethylene copolymer which was preferentially prepared in a mineral oil solution can be conducted by subsequently introducing the $C_{12}$ to about $C_{18}$ hydrocarbyl substituted dicarboxylic acid anhydride directly into the reaction system used to prepare said nitrogen or ester containing grafted ethylene copolymer, or it can be a separate non-integrated reaction step. Generally, the nitrogen or ester containing grafted ethylene copolymer is first produced by preparing the grafted ethylene copolymer and then reacting this grafted copolymer with at least one polyamine or polyol, or with a mixture of carboxylic acid component and polyamine or polyol, or with the preformed carboxylic acid component and polyamine or polyol, and this nitrogen or ester containing grafted ethylene copolymer is then subsequently reacted or treated with the $C_{12}$ to about $C_{18}$ hydrocarbyl substituted dicarboxylic anhydride in a end-capping or chain extension limiting step. A viscosity stabilizing effective amount of the $C_{12}$ to about $C_{18}$ hydrocarbyl substituted dicarboxylic anhydride is introduced into the heated solution containing the nitrogen or ester containing grafted ethylene copolymer and the reaction carried on for a period of about 0.25 to 8 hours at a temperature of about 100° to 200° C. being preferred. In order to fully complete the reaction, it is generally useful to utilize a slight excess, i.e., about 1 to 30, more usually about 1 to 10, percent by weight of the $C_{12}$ to about $C_{18}$ hydrocarbyl substituted dicarboxylic anhydride. The entire reaction is generally carried out under an inert atmosphere, for example, a nitrogen blanket.

This reaction can be conducted in a polar or nonpolar solvent, e.g., xylene, toluene, benzene, and the like, and is preferably conducted in the presence of a mineral or synthetic lubricating oil.

Alternatively, at least a portion of the $C_{12}$ to $C_{18}$ hydrocarbyl substituted dicarboxylic anhydride or other end-capping agent can be introduced into a reaction mixture containing the grafted copolymer prior to or concurrently with the introduction of the polyamine or polyol reactant, and the remaining portion of the end-capping agent can be reacted with the preformed, partially end-capped nitrogen or ester containing grafted ethylene copolymer.

The nitrogen or ester containing grafted ethylene copolymers, i.e., the derivatized ethylene copolymers of the instant invention, either unreacted or reacted with the viscosity stabilizing or end-capping agents described hereinafore, may optionally be post-treated by contacting said derivatized ethylene copolymer with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols. The same post-treating reagents are used with derivatized ethylene copolymers prepared from a combination of polyamines and polyols. However, when the derivatized ethylene copolymers are derived from polyols, that is when they are esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, epoxides, and episulfides.

Since post-treating processes involving the use of these post-treating reagents are known insofar as application to reaction products of high molecular weight carboxylic acid acylating agents of the prior disclosures and amines and/or alcohols, detailed descriptions of these processes herein is unnecessary. In order to apply the prior disclosure processes to the compositions of this invention, all that is necessary is that reaction conditions, ratio of reactants, and the like as described in the prior disclosures, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832, 3,344,069; 3,366,569; 3,373,111; 3,367,943; 3,403,102; 3,428,561; 3,502,677; 3,513,093; 3,533,945; 3,541,012 (use of acidified clays in post-treating carboxylic derivative compositions derived from the acrylating reagents of this invention and amines); U.S. Pat. Nos. 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663; 3,652,616; UK Pat. No. 1,085,903; UK Pat. NO. 1,162,436; U.S. Pat. No. 3,558,743. The processes of these incorporated patents, as applied to the compositions of this invention, and the post-treated compositions thus produced constitute a further aspect of this invention.

A minor amount, e.g. 0.01 up to 49 wt %, preferably 0.05 to 25 wt. %, based on the weight of the total composition, of the V.I. improver-dispersants produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, derivatized copolymer concentrations are usually within the range of about 0.001 to 25 wt %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The derivatized polymers of the invention may be utilized in a concentrate form, e.g., from about 5 wt % up to about 49 wt. %, preferably 7 to 25 wt. %, in oil, e.g., mineral lubricating oil, for ease of handling, and may be prepared in this form by carrying out the reaction of the invention in oil as previously discussed.

The above oil compositions may optionally contain other conventional additives, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8-C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and- /or upon the total weight of any additive-package, or formulation which will be the sum of the a.i. weight of each additive plus the weight of total oil or diluent.

As mentioned hereinafore, the derivatized ethylene copolymers of the present invention are particularly useful as fuel and lubricating oil additives.

The nitrogen or ester containing grafted ethylene copolymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The derivatized ethylene copolymers or terpolymers of the instant invention are oil-soluble, dissolvable in oil with the aid of a suitable solvent, or are stably dispersible therein. The terms oil-soluble, dissolvable in oil, or stably dispersible in oil as that terminology is used herein does not necessarily indicate that the materials are soluble, dissolvable, miscible, or capable of being suspended in oil in all proportions. It does mean, however, that the additives for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving dispersant effective amount, of the additives of the present invention can be incorporated into the fully formulated lubricating oil composition, it is contemplated that such effective amount be sufficient to provide said lube oil composition with an amount of the additive of typically from about 0.001 to about 20, preferably about 0.01 to about 15, more preferably from about 0.1 to about 10, and most preferably from about 0.25 to about 5.0 wt. %, based on the weight of said composition.

The following examples, which include preferred embodiments and wherein all parts and percentages are by weight unless otherwise indicated, further illustrate the present invention.

Example 1 illustrates the preparation of an ethylene-propylene copolymer of the instant invention.

EXAMPLE 1

An ethylene-propylene copolymer having an ethylene content of about 56 wt. %, a thickening efficiency (T.E.) of about 2.6, an $\overline{M}_w$ of about 105,000, an $\overline{M}_n$ of about 96,000 a $\overline{M}_w/\overline{M}_n$ of 1.094 and a $\overline{M}_z/\overline{M}_w$ of 1.086 is prepared in a tubular reactor under the following conditions:

| | |
|---|---|
| Reactor Inlet Temp (°F.) | −4 |
| Reactor Outlet Temp (°F.) | 57 |
| Sidestream Feed Temp. (°F.) | −26 |
| Catalyst Premix Temp (°F.) | 91 |
| Catalyst Premix Time (Sec.) | 7.87 |
| Reactor Residence Time (Sec.) | 1.26/1.40 |
| at Sidestream 1/2 | |
| Inlet Feed Rates (Klb./hr.) | |
| Hexane | 164.8 |
| Ethylene | 1.03 |
| Propylene | 15.36 |
| VCl$_4$ | 0.03375 |
| Al$_2$(C$_2$H$_5$)$_3$ Cl$_3$ | 0.861 |
| Sweep Hexane | 4.926 |
| Sidestream Feed Rates (Klb./hr.) | |
| Hexane | 25 |
| Ethylene | 3.02 |
| Propylene | 5.84 |
| Total Hexane (Klb./hr.) | 194.7 |
| Sidestream Feed Splits (wt. %) | 70/30 |
| Sidestream 1/2 | |

Example 2 illustrates the grafted, i.e., succinic anhydride grafted, ethylene-propylene copolymer of the instant invention.

EXAMPLE 2

700 grams of a 15 wt. % solution in S100 NLP baseoil of a copolymer prepared in accordance with the procedure of Example 1 were introduced into a one liter reactor and heated to 175° C. with nitrogen purge. 17.5 grams of maleic anhydride are charged to the reactor in 10 stages, each stage consisting of 1.75 grams of maleic anhydride. After each charge of maleic anhydride, 0.28 gram of di-t-butyl peroxide was charged to the reactor as initiator for the free radical grafting reaction. After the last charge of di-t-butyl peroxide was introduced into the reactor, the reaction mixture was stripped with nitrogen for two hours. The total acidity of the reaction mixture was determined to be 0.14 meq./g. of sample. The $\overline{M}_w$ and $\overline{M}_n$ of the grafted copolymer were determined by GPC and were found to be 101,000 ($\overline{M}_w$) and 87,000 ($\overline{M}_n$). The $\overline{M}_w/\overline{M}_n$ of this grafted copolymer was determined to be 1.160, while the $\overline{M}_z/\overline{M}_w$ was determined to be 1.137.

Examples 3–5 illustrate the nitrogen containing carboxylic material grafted ethylene-propylene copolymers of the instant invention.

EXAMPLE 3

Into a reactor vessel containing 275 grams of the grafted ethylene-propylene copolymer reaction product of Example 2 heated to 175° C. were charged 51.04 grams of an 80 wt.% solution in S100 NLP of polyisobutenyl succinic anhydride (having a functionality of about 1.05, a polyisobutene $\overline{M}_n$ of about 950, a Saponification Number of 112, and containing about 12% unreacted polyisobutylene). This reaction mixture was stripped with nitrogen for one hour. After completion of nitrogen stripping 4.76 grams of diethylene triamine were introduced into the reaction mixture over a 20 minute period followed by nitrogen stripping of the reaction mixture for 40 minutes.

EXAMPLE 4

Into a reactor vessel containing 275 grams of the grafted ethylene-propylene copolymer reaction product of Example 2 heated to 175° C. were charged 51.04 grams of an 80 wt. % solution in S100 NLP of polyisobutenyl succinic anhydride (having a functionality of about 1.05, a polyisobutylene $\overline{M}_n$ of about 950, a Saponification Number of 112, and containing about 12% unreacted polyisobutylene). This reaction mixture was stripped with nitrogen for one hour. After completion of nitrogen stripping 4.75 grams of diethylene triamine were introduced into the reaction mixture over a 20 minute period followed by nitrogen stripping of the reaction mixture for 40 minutes. Into this reaction mixture were then introduced 2.2 grams of dodecenyl succinic anhydride, and the resultant reaction mixture was soaked for ½ hour.

EXAMPLE 5

Into a reactor vessel containing 275 grams of the grafted ethylene-propylene copolymer reaction product of Example 2 heated to 175° C. were charged 51.04 grams of an 80 wt. % solution in S100 NLP of polyisobutenyl succinic anhydride (having a functionality of about 1.05, a polyisobutylene $\overline{M}_n$ of about 950, a SAP number of 112, and containing about 12% unreacted polyisobutylene) and 1.1 grams of dodecenyl succinic anhydride. This reaction mixture was stripped with nitrogen for one hour. After completion of nitrogen stripping 4.76 grams of diethylene triamine were introduced into the reaction mixture over a 20 minute period followed by nitrogen stripping of the reaction mixture for 40 minutes. Into this reaction mixture were then introduced 1.1 grams of dodecenyl succinic anhydride, and the resultant reaction mixture was soaked for ½ hour.

Comparative Example 6 is presented for comparative purposes only and illustrates a conventional nitrogen containing grafted ethylene-propylene copolymer falling outside the scope of the instant invention.

COMPARATIVE EXAMPLE 6

A conventional ethylene propylene copolymer falling outside the scope of the instant invention having a Thickening Efficiency of about 2.0, an ethylene content of about 42%, a $\overline{M}_n$ of 41,000, a $\overline{M}_w$ of 120,000, a $\overline{M}_w/\overline{M}_n$ of 2.9, and $\overline{M}_z/\overline{M}_w$ of 2.4 is reacted with maleic anhydride substantially in accordance with the procedure as described in Example 2 to form a succinic anhydride grafted ethylene propylene copolymer. A mixture of this succinic anhydride grafted ethylene propylene copolymer of Example 2 and the polyisobutenyl succinic anhydride of Example 3 is reacted with diethylene triamine substantially in accordance with the procedure of Example 3 to form a reaction product mixture comprising the nitrogen containing grafted ethylene-propylene copolymer, which is further reacted with sulfonic acid end-capping agent (4.8 wt. % of sulfonic acid end-capping agent).

EXAMPLE 7

A series of lubricating oil compositions formulated to 10W40 specifications and containing a heavy duty detergent inhibitor package and various amounts, as indicated in Table I, of the reaction products of Examples 3, 4, 5 and Comparative Example 6, were prepared by conventional and well known methods.

The Kinematic Viscosity (KV) at 100° C., in centistokes (cst); Mini Rotary Viscometer (MRV) viscosity at −25° C., in centipoise (cp); Cold Cranking Simulator (CCS) viscosity at −20° C., in centipoise (cp); and TP-1 viscosity at −25° C., in centipoise (cp) of these fully formulated oil compositions were determined and the results are set forth in Table I.

MRV (Mini Rotary Viscometer), using a technique described in ASTM-D3829, measures viscosity in centipoise. MRV was determined at −25° C.

CCS (Cold Cranking Simulator), using a technique described in ASTM-D2602, is a high shear viscosity measurement in centipoise. This test is related to a lubricating oil's resistance to cold engine starting.

TP-1, is determined using a technique described in ASTM-04684. This is essentially the same as the MRV noted above, except that a slow cooling cycle is used. The cycle is defined in SAE Paper No. 850443, K. O. Henderson et al.

Additionally, the Shear Stability Index (SSI), in %, of the nitrogen containing succinic anhydride grafted ethylene-propylene copolymers of Examples 3, 4, 5 and Comparative Example 6 were determined and the results are also set forth in Table I. Shear Stability Index (SSI) measures the mechanical stability of polymers used as V.I. improvers in crankcase lubricants subjected to high strain rates. The diesel fuel injector test was used (CEC L-14-A-79, equivalent to DIN 51382). To determine SSI the polymer under test is dissolved in a suitable base oil (for example, a solvent extracted 150 neutral) to a relative viscosity of 2 to 3 at 100° C. The oil solution is then circulated through a diesel fuel injector, for a total of thirty passes. The SSI is calculated from the initial 100° C. kinematic viscosity ($V_i$), the final kinematic viscosity ($V_f$), and the base oil viscosity ($V_b$), as SSI (%) = $100 \times (V_i - V_f)/(V_i - V_b)$. A reference sample (as required by the DIN method) is used to calibrate the test. The SSI is indicative of the resistance of a polymer to molecular weight degradation by extensional forces. The higher the SSI the less stable the polymer, i.e., the more susceptible it is to molecular weight degradation.

Furthermore, Thickening Efficiency (T.E.), as used herein, is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 100° C., to the weight percent of a test copolymer required to thicken the same oil to the same viscosity at the same temperature. T.E. is related to ($M_n$) and is a convenient, useful measurement for formulation of lubricating oils of various grades.

TABLE I

| Additive | Amount of MFVI Additive Wt. % (polymer) | KV cst | SSI % | CCS cp | MRV cp | TP-1 cp |
|---|---|---|---|---|---|---|
| Example 3 | 1.00 | 13.84 | 41 | 3635 | 17332 | 14391 |
| Example 4 | 1.02 | 13.90 | 39 | 3680 | 15880 | 14136 |
| Example 5 | 1.01 | 14.14 | 44 | 3450 | 15762 | 13604 |
| Comparative Example 6 | 0.97 | 14.67 | 46 | 4226 | 3111 | 24694 |

As illustrated by the data in Table I lubricating oil compositions containing the nitrogen containing succinic anhydride grafted ethylene-propylene copolymers of the instant invention (Examples 3, 4 and 5) exhibit much better low temperature viscometric properties (CCS, MRV, TP-1) than the lubricating oil composition containing a conventional nitrogen containing succinic anhydride grafted ethylene-propylene copolymer falling outside the scope of the instant invention (Comparative Example 6).

Furthermore, comparison of the Shear Stability Index of the nitrogen containing succinic anhydride grafted ethylene-propylene copolymers of the instant invention (Examples 3-5) with the Shear Stability Index of the conventional nitrogen containing succinic anhydride grafted ethylene-propylene copolymer falling outside the scope of the instant invention (Comparative Example 6) shows that the instant materials are more Shear Stable, i.e., exhibit better mechanical properties, than the conventional materials falling outside the scope of the instant invention.

Thus, the present invention provides multifunctional viscosity index improvers which exhibit improved shear stability, i.e., improved mechanical properties, provide oil compositions exhibiting improved low temperature viscometric properties and impart substantially the same or similar dispersancy to oil compositions as conventional multifunctional viscosity index improvers.

What is claimed is:

1. Composition of matter useful as multifunctional viscosity index improver additive for oleaginous composition comprising reaction product of:
   (i)
       (a) copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene, said copolymer grafted at a temperature below about 225° C. with
       (b) ethylenically monounsaturated carboxylic acid material having 1 to 2 carboxylic acid groups or anhydride group to form grafted ethylene copolymer; and
   (ii) at least one of
       (a) polyamine having at least two reactive amino groups selected from primary amino groups, secondary amino groups and mixtures thereof,
       (b) polyol,
       (c) about $C_{50}$ to about $C_{400}$ hydrocarbyl substituted carboxylic acid component containing 1 to 2 carboxylic acid groups or anhydride group, and polyol, and
       (d) polyamine having at least two reactive amino groups selected from primary amino groups, secondary amino groups and mixtures thereof, and about $C_{50}$ to about $C_{400}$ hydrocarbyl substituted carboxylic acid component containing 1 to 2 carboxylic acid groups or anhydride groups.

2. The composition according to claim 1, wherein said copolymer (i)(a) has an intermolecular compositional dispersity such that 95 weight % of said copolymer chains have a composition 15 weight % or less different from said average ethylene composition.

3. The composition according to claim 2 wherein said intermolecular compositional dispersity of said copolymer (i)(a) is such that 95 weight % of said copolymer chains have a composition 10 wt. % or less different from said average ethylene composition.

4. The composition according to claim 1 wherein said low crystallinity segment comprises from about 20 to 53 wt. % ethylene.

5. The composition according to claim 4 wherein said crystallizable segment comprises at least about 57 wt. % ethylene.

6. The composition according to claim 5 wherein said copolymer (i)(a) is characterized by a weight-average molecular weight of from about 20,000 to about 250,000.

7. The composition according to claim 5, wherein said low crystallinity segment of said copolymer (i)(a) comprises from about 30 to 50 weight % ethylene.

8. The composition according to claim 1, wherein said copolymer (i)(a) has a MWD characterized by at least one of a ratio of $\overline{M}_w/\overline{M}_n$ of less than about 1.5 and a ratio of $\overline{M}_z/\overline{M}_w$ of less than about 1.5.

9. The composition according to claim 8, wherein said copolymer (i)(a) has a MWD characterized by at least one of a ratio of $\overline{M}_w/\overline{M}_n$ of less than about 1.25 and a ratio of $\overline{M}_z/\overline{M}_w$ of less than about 1.2.

10. The composition according to claim 8 wherein said intermolecular compositional dispersity of said copolymer (i)(a) is such that 95 weight % of said copolymer chains have a composition 13 weight % or less different from said average ethylene composition.

11. The composition according to claim 1, wherein said copolymer (i)(a) has a total minimum ethylene content of about 20 % on a weight basis.

12. The composition according to claim 1, wherein said copolymer's (i)(a) chain segment sequences are characterized by at least one of the structures:

$$M-T \qquad (I)$$

$$T^1-(M-T^2)_x \qquad (II)$$

$$T^1-(M^1-T^2)_y-M^2 \qquad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises a T segment.

13. The composition according to claim 12, wherein said copolymer's (i)(a) segment sequences are characterized by structure I.

14. The composition according to claim 12, wherein said copolymer's (i)(a) chain segment sequences are characterized by structure II.

15. The composition according to claim 14, wherein x is one.

16. The composition according to claim 15, wherein in said copolymer (i)(a) said $T^1$ and $T^2$ segments are of about the same weight-average molecular weight.

17. The composition according to claim 16, wherein in said copolymer (i)(a) the sum of the weight average molecular weights of said $T^1$ and $T^2$ segments is about equal to the weight-average molecular weight of said M segment.

18. The composition according to claim 12, wherein said copolymer (i)(a) has a MWD characterized by at least one of a ratio of $\overline{M}_w/\overline{M}_n$ of less than about 1.5 and a ratio of $\overline{M}_z/\overline{M}_w$ of less than about 1.5.

19. The composition according to claim 18, wherein said copolymer (i)(a) has a MWD characterized by at least one of a ratio of $\overline{M}_w/\overline{M}_n$ of less than about 1.25 and a ratio of $\overline{M}_z/\overline{M}_w$ of less than about 1.2.

20. The composition according to claim 1 wherein said (i)(b) is selected from $C_3$ to $C_{10}$ monounsaturated monocarboxylic acid.

21. The composition according to claim 1 wherein said (i)(b) is selected from $C_4$ to $C_{10}$ monounsaturated dicarboxylic acids or anhydrides.

22. The composition according to claim 21 wherein (i)(b) is selected from the group consisting of maleic acid, maleic anhydride, and mixtures thereof.

23. The composition according to claim 22, wherein (i)(b) is maleic anhydride.

24. The composition according to claim 23 wherein said polyamine (ii)(a) is selected from the group consisting of poly(oxyalkylene amines) and poly(alkylene amine).

25. The composition according to claim 23 wherein said polyamine contains at least two primary amino groups.

26. The composition according to claim 25 wherein said polyamine is diethylene triamine.

27. The composition according to claim 23 which is comprised of reaction product of (i), (ii), and (iii) viscosity stabilizing effective amount of $C_{12}$ to about $C_{18}$ hydrocarbyl substituted dicarboxylic anhydride.

28. The composition according to claim 27 wherein said $C_{12}$ to about $C_{18}$ hydrocarbyl substituted dicarboxylic anhydride is $C_{12}$ to about $C_{18}$ hydrocarbyl substituted succinic anhydride.

29. The composition according to claim 21 wherein (ii) is (b).

30. The composition according to claim 21 wherein (ii) is (a).

31. The composition according to claim 21 wherein (ii) is (d).

32. The composition according to claim 31 wherein said polyamine contains at least two primary amino groups.

33. The composition according to claim 32 wherein said polyamine is diethylene triamine.

34. The composition according to claim 31 wherein said polyamine is selected from poly(oxyalkylene amines) and poly(alkylene amines).

35. The composition according to claim 31 wherein said about $C_{50}$ to about $C_{400}$ hydrocarbyl substituted carboxylic acid component is an bout $C_{50}$ to about $C_{400}$ hydrocarbyl substituted $C_4$ to $C_{10}$ dicarboxylic acid or anhydride.

36. The composition according to claim 35 wherein said about $C_{50}$ to about $C_{400}$ hydrocarbyl substituted $C_4$ to $C_{10}$ dicarboxylic acid is about $C_{50}$ to about $C_{400}$ hydrocarbyl substituted succinic acid or anhydride.

37. The composition according to claim 36 wherein said $C_{50}$ to about $C_{400}$ hydrocarbyl substituted succinic acid or anhydride is polyisobutenyl substituted succinic acid or anhydride.

38. The composition according to claim 31 which is comprised of (i) and (ii)(d) further reacted with (iii) viscosity stabilizing effective amount of $C_{12}$ to about $C_{18}$ hydrocarbyl substituted dicarboxylic anhydride.

39. The composition according to claim 38 wherein said $C_{12}$ to about $C_{18}$ hydrocarbyl substituted dicarboxylic anhydride is $C_{12}$ to about $C_{18}$ hydrocarbyl substituted succinic anhydride.

40. The composition according to claim 1 wherein said polyamine contains at least two primary amino groups.

41. The composition according to claim 40 wherein said polyamine is diethylene triamine.

42. The composition according to claim 1, wherein said polyamine (ii)(a) is selected from the group consisting of poly(oxyalkylene amines) and poly(alkylene amines).

43. The composition according to claim 1 which is comprised of reaction product of (i) and (ii), further reacted with (iii) viscosity stabilizing effective amount of $C_{12}$ to about $C_{18}$ hydrocarbyl substituted dicarboxylic anhydride.

44. The composition according to claim 43 wherein said $C_{12}$ to about $C_{18}$ hydrocarbyl substituted dicarboxylic anhydride is $C_{12}$ to about $C_{18}$ hydrocarbyl substituted succinic anhydride.

45. The composition according to claim 1 wherein (ii) is (b).

46. The composition according to claim, 1 wherein (ii) is (d).

47. The composition according to claim 46 wherein said polyamine contains at least two primary amino groups.

48. The composition according to claim 42 wherein said polyamine is diethylene triamine.

49. The composition according to claim 46 wherein said polyamine is selected from poly(oxyalkylene amines) and poly(alkylene amines).

50. The composition according to claim 46 wherein said about $C_{50}$ to about $C_{400}$ hydrocarbyl substituted carboxylic acid component is an about $C_{50}$ to about $C_{400}$ hydrocarbyl substituted $C_4$ to $C_{10}$ dicarboxylic acid or anhydride.

51. The composition according to claim 46 wherein said about $C_{50}$ to about $C_{400}$ hydrocarbyl substituted $C_4$ to $C_{10}$ dicarboxylic acid or anhydride is about $C_{50}$ to about $C_{400}$ hydrocarbyl substituted succinic acid or anhydride.

52. The composition according to claim 51 wherein said about $C_{50}$ to about $C_{400}$ hydrocarbyl substituted succinic acid or anhydride is polyisobutenyl substituted succinic acid or anhydride.

53. The composition according to claim 46 which is comprised of (i) and (ii)(d) further reacted with (iii) viscosity stabilizing effective amount of $C_{12}$ to about $C_{18}$ hydrocarbyl substituted dicarboxylic anhydride.

54. The composition according to claim 53 wherein said $C_{12}$ to about $C_{18}$ hydrocarbyl substituted dicarboxylic anhydride is $C_{12}$ to about $C_{18}$ hydrocarbyl substituted succinic anhydride.

55. The composition according to claim 1 wherein (ii) is (c).

56. The composition according to claim 1, wherein (ii) is (a).

57. The composition according to claim 1 wherein said grafting conditions are effective to produce grafted ethylene copolymer having molecular weight distribution which does not differ by more than about 10% from the molecular weight distribution of said copolymer of ethylene.

58. The composition according to claim 1 wherein said solution grafting conditions comprise free-radical initiated grafting in solution.

59. The composition according to claim 58 wherein said grafting conditions comprise free-radical initiated grafting in oil solution.

60. The composition according to claim 59 wherein said polyamine (ii)(a) contains at least two primary amino groups.

61. The composition according to claim 60 said composition comprises reaction product of (i) and (ii)(a) further reacted with (iii) viscosity stabilizing effective amount of $C_{12}$ to about $C_{18}$ hydrocarbyl substituted dicarboxylic anhydride.

62. The composition according to claim 61 wherein (iii) comprises $C_{12}$ to about $C_{18}$ hydrocarbyl substituted succinic anhydride.

63. A lubricating oil composition comprising:
1. lubricating oil or grease; and
2. viscosity index improving effective amount of multifunctional viscosity index improver comprised of reaction product of:
   (i)
   (a) copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and in ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene, said copolymer grafted at temperatures below about 225° C. with
   (b) ethylenically monounsaturated carboxylic acid material having 1 to 2 carboxylic acid groups or anhydride group to form grafted ethylene copolymer; and
   (ii) at least one of
   (a) polyamine having at least two reactive amino groups, selected from primary amino groups, secondary amino groups and mixtures thereof,
   (b) polyol,
   (c) about $C_{50}$ to about $C_{400}$ hydrocarbyl substituted carboxylic acid component containing 1 to 2 carboxylic acid groups or anhydride group, and polyol, and
   (d) polyamine containing at least two reactive amino groups selected from primary amino groups, secondary amino groups and mixtures thereof, and about $C_{50}$ to about $C_{400}$ hydrocarbyl substituted carboxylic acid component containing 1 to 2 carboxylic acid groups or anhydride group.

64. The composition according to claim 63 which contains viscosity index improving and dispersant effective amount of (2).

65. The composition according to claim 64 which contains from about 0.001 to about 20 wt. % of (2).

66. The composition according to claim 65 which contains from about 0.01 to about 15 wt. % of (2).

67. The composition according to claim 66 which contains from about 0.1 to about 10 wt. % of (2).

68. The composition according to claim 63 which contains from about 0.001 to about 49 wt. % of (2).

69. The composition according to claim 63 wherein (1) is a lubricating oil.

70. The composition according to claim 69 wherein (i) is a lubricating oil, and wherein said composition comprises from about 5 Wt % to about 49 wt % of (2).

71. The composition according to claim 69 wherein said composition further comprises at least one member selected from the group consisting of pour point depressants, antiwear agents, antioxidants, dispersants, rust inhibitors, friction modifiers and anti-foaming agents.

72. The composition according to claim 63, wherein said copolymer (2)(i)(a) has an intermolecular compositional dispersity such that 95 weight % of said copolymer chains have a composition 15 weight % or less different from said average ethylene composition.

73. The composition according to claim 72 wherein said intermolecular compositional dispersity of said copolymer (2)(i)(a) is such that 95 weight % of said copolymer chains have a composition 10 wt. % or less different from said average ethylene composition.

74. The composition according to claim 63 wherein said low crystallinity segment of said copolymer (2)(i)(a) comprises from about 20 to 53 wt. % ethylene.

75. The composition according to claim 74 wherein said crystallizable segment of said copolymer (2)(i)(a) comprises at least about 57 wt. % ethylene.

76. The composition according to claim 45 wherein said copolymer (2)(i)(a) is characterized by a weight-average molecular weight of from about 20,000 to about 250,000.

77. The composition according to claim 74 wherein said low crystallinity segment of said copolymer (2)(i)(a) comprises from about 30 to 50 weight % ethylene.

78. The composition according to claim 63 wherein said copolymer (2)(i)(a) has a MWD characterized by at least one of a ratio of $\overline{M}_w/\overline{M}_n$ of less than about 1.5 and a ratio of $\overline{M}_z/\overline{M}_w$ of less than about 1.5.

79. The composition according to claim 78 wherein said copolymer (2)(i)(a) has a MWD characterized by at least one of a ratio of $\overline{M}_w/\overline{M}_n$ of less than about 1.25 and a ratio of $\overline{M}_z/\overline{M}_w$ of less than about 1.2.

80. The composition according to claim 78 wherein said intermolecular compositional dispersity of said copolymer (2)(i)(a) is such that 95 weight % of said copolymer chains have a composition 13 weight % or less different from said average ethylene composition.

81. The composition according to claim 74 wherein said copolymer (2)(i)(a) has a total minimum ethylene content of about 20 % on a weight basis.

82. The composition according to claim 63 wherein said copolymers (2)(i)(a) chain segment sequences are characterized by at least one of the structures:

$$M-T-(I)$$

$$T^1-(M-T^2)_x \quad (II)$$

$$T^1-(M^1-T^2)_y-M^2 \quad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises a T segment.

83. The composition according to claim 82 wherein said copolymer's (2)(i)(a) segment sequences are characterized by structure I.

84. The composition according to claim 82 wherein said copolymer's (2)(i)(a) chain segment sequences are characterized by structure II.

85. The composition according to claim 84 wherein x is one.

86. The composition according to claim 85 wherein in copolymer (2)(i)(a) said $T^1$ and $T^2$ segments are of substantially the same weight-average molecular weight.

87. The composition according to claim 86 wherein in said copolymer (2)(i)(a) the sum of the weight average molecular weights of said $T^1$ and $T^2$ segments is about equal to the weight-average molecular weight of said M segment.

88. The composition according to claim 87 wherein said copolymer (2)(i)(a) has a MWD characterized by at least one of a ratio of $\overline{M}_w/\overline{M}_n$ of less than about 1.5 and a ratio of $\overline{M}_z/\overline{M}_w$ of less than about 1.5.

89. The composition according to claim 88 wherein said copolymer (2)(i)(a) has a MWD characterized by at least one or a ratio of $\overline{M}_w/\overline{M}_n$ of less than about 1.25 and a ratio of $\overline{M}_z/\overline{M}_w$ of less than about 1.2.

90. The composition according to claim 89 wherein said copolymer (2)(i)(a) has a MWD characterized by both a ratio of $\overline{M}_w/\overline{M}_n$ of less than about 1.25 and a ratio of $\overline{M}_z/\overline{M}_w$ of less than about 1.2.

91. The composition according to claim 63 wherein (2)(ii) is (d).

92. The composition according to claim 91 wherein said polyamine contains at least two primary amino groups.

93. The composition according to claim 92 wherein said polyamine is selected from poly(oxyalkylene amines) and poly(alkylene amines).

94. The composition according to claim 92 wherein said polyamine is diethylene trimaine.

95. The composition according to claim 91 wherein said about $C_{50}$ to about $C_{400}$ hydrocarbyl substituted carboxylic acid component is $C_{50}$ to $C_{400}$ hydrocarbyl substituted $C_4$ to $C_{10}$ dicarboxylic acid or anhydride.

96. The composition according to claim 95 wherein said carboxylic acid component is selected from the group consisting of $C_{50}$ to $C_{400}$ hydrocarbyl substituted succinic acid, anhydride, and mixtures thereof.

97. The composition according to claim 96 wherein said carboxylic acid component comprises polybutenyl substituted succinic anhydride.

98. The composition according to claim 91 wherein said polyamine is selected from poly(oxyalkylene amines) and poly(alkylene amines).

99. The composition according to claim 91 wherein (2) is comprised of reaction product of (i) and (ii)(d) further reacted with (iii) viscosity stabilizing effective amount of $C_{12}$ to about $C_{18}$ hydrocarbyl substituted dicarboxylic anhydride.

100. The composition according to claim 99 wherein (2)(iii) is comprised of $C_{12}$ to about $C_{18}$ hydrocarbyl substituted $C_4$ to $C_{10}$ dicarboxylic anhydride.

101. The composition according to claim 100 wherein (2)(iii) is comprised of $C_{12}$ to about $C_{18}$ hydrocarbyl substituted succinic anhydride.

102. The composition according to claim 101 wherein (2)(iii) is comprised of $C_{12}$ to about $C_{18}$ alkenyl substituted succinic anhydride.

103. The composition according to claim 63 wherein said copolymer (2)(i)(a) has a total ethylene content of greater than about 35% on a weight basis.

104. The composition according to claim 63 wherein (2)(i)(b) is selected from $C_3$ to $C_{10}$ monounsaturated monocarboxylic acids.

105. The composition according to claim 63 wherein (2)(ii) is (b).

106. The composition according to claim 105 wherein (2) is comprised of reaction product of (i) and (ii)(b) further reacted with (iii) viscosity stabilizing effective amount of $C_{12}$ to about $C_{18}$ hydrocarbyl substituted dicarboxylic anhydride.

107. The composition according to claim 106 wherein (2)(iii) is $C_{12}$ to about $C_{18}$ hydrocarbyl substituted succinic anhydride.

108. The composition according to claim 63 wherein (2)(i)(b) is selected from $C_4$ to $C_{10}$ monounsaturated dicarboxylic acids or anhydrides.

109. The composition according to claim 108 wherein (2)(i)(b) is selected from the group consisting of maleic acid, maleic anhydride, and mixtures thereof.

110. The composition according to claim 109 wherein (2)(i)(b) is maleic anhydride.

111. The composition according to claim 109 wherein (2)(i)(b) is maleic anhydride.

112. The composition according to claim 108 wherein said polyamine (ii)(a) or (ii)(d) is selected from poly(oxyalkylene amines) and poly(alkylene amines).

113. The composition according to claim 112 wherein said polyamine (ii)(a) or (ii)(d) contain at least two primary amino groups.

114. The composition according to claim 108 wherein (2)(ii) is (b).

115. The composition according to claim 114 wherein (2) is comprised of reaction product of (i) and (ii)(b) further reacted with (iii) viscosity stabilizing effective amount of $C_{12}$ about $C_{18}$ hydrocarbyl substituted dicarboxylic anhydride.

116. The composition according to claim 115 wherein (2)(ii) is $C_{12}$ to about $C_{18}$ hydrocarbyl substituted succinic anhydride.

117. The composition according to claim 108 wherein (2)(ii) is (c).

118. The composition according to claim 117 wherein said about $C_{50}$ to about $C_{400}$ hydrocarbyl substituted carboxylic acid component is about $C_{50}$ to about $C_{400}$ hydrocarbyl substituted succinic anhydride.

119. The composition according to claim 118 wherein said about $C_{50}$ to about $C_{400}$ hydrocarbyl substituted succinic anhydride comprises polybutenyl substituted succinic anhydride.

120. The composition according to claim 119 wherein (2) is comprised of reaction product of (i) and (ii)(c) further reacted with (iii) viscosity stabilized effective amount of $C_{12}$ to about $C_{18}$ hydrocarbyl substituted dicarboxylic anhydride.

121. The composition according to claim 120 wherein (iii) is $C_{12}$ to about $C_{18}$ hydrocarbyl substituted succinic anhydride.

122. The composition according to claim 108 wherein (2)(ii) is (d).

123. The composition according to claim 122 wherein said polyamine contains at least two primary amino groups.

124. The composition according to claim 123 wherein said polyamine is selected from poly(oxyalkylene amines) and poly(alkylene amines).

125. The composition according to claim 123 wherein said polyamine is diethylene triamine.

126. The composition according to claim 122 wherein said polyamide is selected from poly(oxyalkylene amines) and poly(alkylene amines).

127. The composition according to claim 122 wherein said about $C_{50}$ to about $C_{400}$ hydrocarbyl substituted carboxylic acid component comprises $C_{50}$ to $C_{400}$ hydrocarbyl substituted $C_4$ to $C_{10}$ dicarboxylic acid or anhydride.

128. The composition according to claim 127 wherein said carboxylic acid component is selected from the group consisting of $C_{50}$ to $C_{400}$ hydrocarbyl substituted succinic acid, anhydride, and mixtures thereof.

129. The composition according to claim 128 wherein said carboxylic acid component comprises polybutenyl substituted succinic anhydride.

130. The composition according to claim 122 wherein (2) is comprised of reaction product of (i) and (ii)(d) further reacted with (iii) viscosity stabilizing effect amount of $C_{12}$ to about $C_{18}$ hydrocarbyl substituted dicarboxylic anhydride.

131. The composition according to claim 130 wherein (2)(iii) is comprised of $C_{12}$ to about $C_{18}$ hydrocarbyl substituted $C_4$ to $C_{10}$ dicarboxylic anhydride.

132. The composition according to claim 131 wherein (2)(iii) is comprised of $C_{12}$ to about $C_{18}$ hydrocarbyl substituted succinic anhydride.

133. The composition according to claim 132 wherein (2)(iii) is comprised of $C_{12}$ to about $C_{18}$ alkenyl substituted succinic anhydride.

134. The composition according to claim 108 wherein (2)(ii) is (a).

135. The composition according to claim 134 wherein said polyamino contains at least two primary amino groups.

136. The composition according to claim 135 wherein said polyamine is diethylene triamine.

137. The composition according to claim 134 wherein said polyamine is selected from poly(oxyalkylene amines) and poly(alkylene amines).

138. The composition according to claim 137 wherein said polyamine contains at least two primary amino groups.

139. The composition according to claim 134 wherein (2) is comprised of reaction product of (i) and (ii)(a) further reacted with (iii) viscosity stabilizing effective amount of $C_{12}$ to about $C_{18}$ hydrocarbyl substituted dicarboxylic anhydride.

140. The composition according to claim 135 wherein said polyamine (ii)(a) of (ii)(d) contains at least two primary amino groups.

141. The composition according to claim 140 wherein said polyamine (ii)(a) of (ii)(d) is diethylene triamine.

142. The composition according to claim 140 wherein (2) is comprised of reaction product of (i) and ii further reacted with (iii) viscosity stabilizing effective amount of $C_{12}$ to about $C_{18}$ hydrocarbyl substituted $C_4$ to about $C_{10}$ dicarboxylic anhydride.

143. The composition according to claim 142 wherein (2) (iii) is $C_{12}$ to $C_{18}$ hydrocarbyl substituted succinic anhydride.

144. The composition according to claim 143 wherein (2) (iii) is $C_{12}$ to about $C_{18}$ alkenyl substituted succinic anhydride.

145. The composition according to claim 63 wherein (2)(ii) is (c).

146. The composition according to claim 145 wherein said about $C_{50}$ to about $C_{400}$ hydrocarbyl substituted carboxylic acid component is about $C_{50}$ to about $C_{400}$ hydrocarbyl substituted succinic anhydride.

147. The composition according to claim 146 wherein said about $C_{50}$ to about $C_{400}$ hydrocarbyl substituted succinic anhydride comprises polybutenyl succinic anhydride.

148. The composition according to claim 145 wherein (2) is comprised of reaction product of (i) and (ii)(c) further reacted with (iii) viscosity stabilizing effective amount of $C_{12}$ to about $C_{18}$ hydrocarbyl substituted dicarboxylic anhydride.

149. The composition according to claim 148 wherein (2)(ii) is $C_{12}$ to about $C_{18}$ hydrocarbyl substituted succinic anhydride.

* * * * *